United States Patent
Hagiwara et al.

(10) Patent No.: US 8,384,921 B2
(45) Date of Patent: Feb. 26, 2013

(54) IMAGE FORMING APPARATUS AND METHOD FOR MANAGING A MODE PROGRAM CONSTITUTED BY OPERATION MODE INFORMATION SET TO A JOB PERFORMED BY THE IMAGE FORMING APPARATUS

(75) Inventors: Aritaka Hagiwara, Kanagawa (JP); Tadashi Nagata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 909 days.

(21) Appl. No.: 12/194,569

(22) Filed: Aug. 20, 2008

(65) Prior Publication Data

US 2009/0051953 A1 Feb. 26, 2009

(30) Foreign Application Priority Data

Aug. 24, 2007 (JP) .................................. 2007-218595
Aug. 1, 2008 (JP) .................................. 2008-200036

(51) Int. Cl.
*G06F 3/12* (2006.01)
(52) U.S. Cl. ...................... 358/1.13; 358/1.14; 358/1.15; 715/762; 715/765
(58) Field of Classification Search .................. 358/1.13, 358/1.14, 1.15; 715/762, 765
See application file for complete search history.

(56) References Cited

U.S. PATENT DOCUMENTS

| | | | |
|---|---|---|---|
| 2005/0270557 A1* | 12/2005 | Ookuma | 358/1.13 |
| 2006/0044587 A1* | 3/2006 | Yoshida | 358/1.13 |
| 2007/0041610 A1 | 2/2007 | Kaneko et al. | |
| 2007/0220475 A1* | 9/2007 | Asahara | 716/17 |

FOREIGN PATENT DOCUMENTS

| | | |
|---|---|---|
| JP | 2001-243137 | 9/2001 |
| JP | 3679349 | 8/2005 |
| JP | 2006-067328 | 3/2006 |
| JP | 2006-338507 | 12/2006 |
| JP | 2007-006287 | 1/2007 |
| JP | 2007-158929 | 6/2007 |

OTHER PUBLICATIONS

Japanese Office Action dated Nov. 27, 2012.

* cited by examiner

*Primary Examiner* — Jacky X Zheng
(74) *Attorney, Agent, or Firm* — IPUSA, PLLC

(57) ABSTRACT

An image forming apparatus registers a mode program constituted by operation mode information set to a job in order to execute the job by retrieving the mode program. A mode program registration section outputs an instruction to acquire the operation mode information set to the job and acquires the operation mode information. An operation mode acquisition section sends a request to a software part corresponding to a process constituting said job to acquire the operation mode information, and acquires and outputs the operation mode information of a predetermined type, which is a return value output from the software part, to the mode program registration section. A mode program information management section creates mode program information including the operation mode information acquired by the mode program registration section and identification information of the mode program, and stores the mode program information in a mode program information retaining section.

16 Claims, 28 Drawing Sheets

FIG.14

| CLASS TO MANAGE | KEY | DATA TO PERPETUATE |
|---|---|---|
| OPERATION MODE | OPERATION MODE KEY | OPERATION MODE INFORMATION |

FIG.15

| CLASS TO MANAGE | KEY | DATA TO PERPETUATE |
|---|---|---|
| MODE PROGRAM FUNCTION | PROGRAM ID | OPERATION MODE ID (001) |
| | | OPERATION MODE ID (002) |
| | | OPERATION MODE ID (003) |

FIG.16

| PROGRAM ID | APPLICATION NAME | PROGRAM NAME | DATE |
|---|---|---|---|
| ... | ... | ... | ..... |

IMAGE FORMING APPARATUS AND METHOD FOR MANAGING A MODE PROGRAM CONSTITUTED BY OPERATION MODE INFORMATION SET TO A JOB PERFORMED BY THE IMAGE FORMING APPARATUS

BACKGROUND OF THE INVENTION

1. Field of the Invention

The present invention relates to an image forming apparatus an image forming method and a computer readable recording medium storing an image forming program.

2. Description of the Related Art

Conventionally, an image forming apparatus having a mode program function has been used. According to the mode program function, an operating condition is set to each of the processes constituting a job performed by an image processing apparatus for each kind of job. The operating condition is retained in the image forming apparatus so that the image forming apparatus performs a job in accordance with the retained operating condition.

For example, Japanese Laid-Open Patent Application No. 2006-67328 (Patent Document 1) discloses an image processing apparatus that permits a reliable operation of a macro containing an event synchronous to a user operation and an event asynchronous to the user operation. In order to achieve such a reliable operation of a macro, the image processing apparatus is provided with a recording means that sequentially records procedures of an operation performed by an operator and a recording means that records a status according to an event generated asynchronously. It should be noted that the macro function recited in the Patent Document 1 corresponds to the above-mentioned mode program function.

Additionally, Japanese Patent Publication No. 3679349 (Patent Document 2) discloses an image forming apparatus provided with applications each corresponding to each of a plurality of processes constituting a job performed by the image forming apparatus and a control program used through the applications in common. According to the image forming apparatus disclosed in the Patent Document 2, the applications can be expanded and changed easily.

However, when applying the macro function disclosed in the Patent Document 1 to the image forming apparatus disclosed in the Patent Document 2, the operating condition set by the mode program function must be retained for each application. Thus, it is considered to provide a memory means to retain the operating condition so as to use the memory means from each application in common. However, such a scheme requires a process using an interface to access the memory means, which is shared by the applications, for each application.

According to the above-mentioned scheme, each application must carry out a process corresponding to the mode program function. Thus, when a different application is mounted to each image forming apparatus, a part for performing the process of the mode program function must be changed for each image forming apparatus.

SUMMARY OF THE INVENTION

It is a general object of the present invention to provide a novel, improved and useful image forming apparatus and method in which the above-mentioned problems are eliminated.

A more specific object of the present invention is to provide an image forming apparatus and method which can easily perform a mode program function even when a structure of software parts mounted to each image forming apparatus varies.

In order to achieve the above-mentioned objects, there is provided according to one aspect of the present invention An image forming apparatus comprising: a mode program registration section configured to output an instruction to acquire the operation mode information set to a job and configured to acquire the operation mode information; an operation mode acquisition section configured to send a request to a software part corresponding to the job to acquire the operation mode information, configured to acquire the operation mode information of a predetermined type, which is a return value output from the software part, and configured to output to the mode program registration section; and a mode program information management section configured to create mode program information including the operation mode information acquired by the mode program registration section and identification information of the mode program, and configured to store the mode program information in a mode program information retaining section.

According to the above-mentioned image forming apparatus, a mode program function can be achieved easily even when the structures of the software parts mounted are different from each other.

According to another aspect of the present invention, there is provided an image forming method performed by each section of the above-mentioned image forming apparatus. Additionally, there is provided a computer program that causes a computer to perform the image forming method. Furthers there is provided an information recording medium that stores the computer program.

Other objects, features and advantages of the present invention will become more apparent from the following detailed description when read in conjunction with the accompanying drawings.

BRIEF DESCRIPTION OF THE DRAWINGS

FIG. 10 is a display of the setting screen of a copy application after a sort is set to ON;

FIG. 14 is an illustration showing a perpetuation form of an operating mode;

FIG. 15 is an illustration showing a perpetuation form of mode program information;

FIG. 16 is an illustration showing a perpetuation form of mode program display information;

DETAILED DESCRIPTION OF THE PREFERRED EMBODIMENTS

A description will now be given of embodiments of the present invention with reference to the drawings.

First Embodiment

Figure 1:
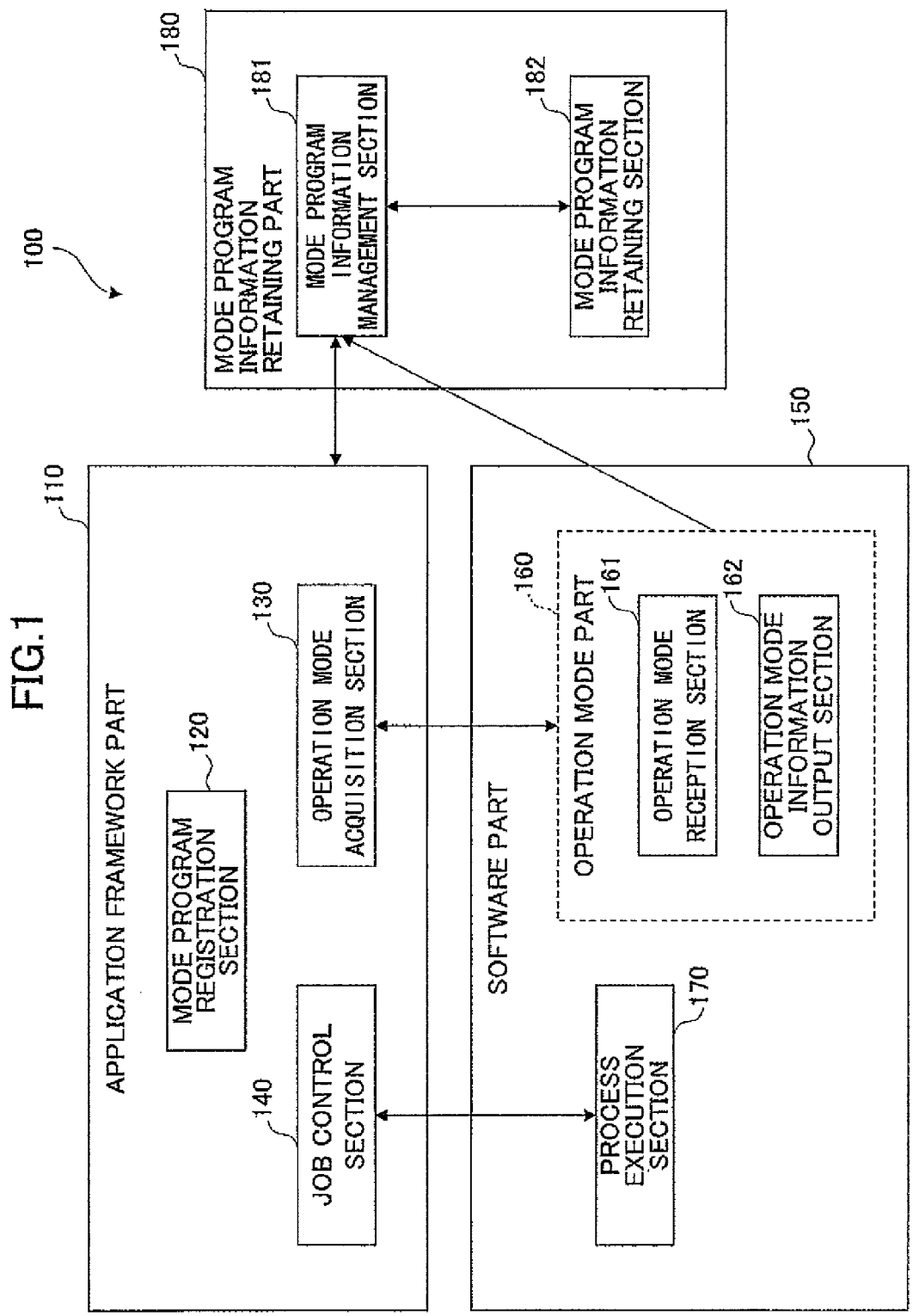
FIG. 1 is a block diagram of a functional structure of an image forming apparatus according to a first embodiment of the present invention.

FIG. 1 shows an example of a functional structure of an image forming apparatus according to a first embodiment of the present invention. The image forming apparatus 100 shown in FIG. 1 includes an application framework part 110, a software part 150 and a mode program information retaining part 180.

The application framework part 110 performs a mode program function. The application framework part 100 sends an instruction to acquire an operation mode to the software part 150, and controls a job corresponding to a mode program. The mode program function refers to a function to execute jobs according to the same operation mode by retrieving a mode program after storing an operation mode, as the mode program, which is set to a job to be executed by an application Accordingly, the mode program corresponds to data to which the operation mode set to a job is related. Additionally, the operation mode refers to the operating condition of a job.

The application framework part 110 includes a mode program registration section 120, an operation mode acquisition section 130 and a job control section 140.

The mode program registration section 120 receives an instruction of registration (save) of a mode program input by an operator, and controls a process for registering the mode program. The mode program registration section 120 sends an instruction to acquire the operation mode set to the software parts 150, which corresponds to the operation mode acquisition section 130, in accordance with the instruction of registration of the mode program.

The mode program registration section 120 acquires mode information (information including a setting value with respect to a setting item constituting an operation mode) as a return value for the instruction of acquisition of the operation mode. The acquired operation mode information is stored in a mode program information retaining part 180 mentioned later.

The mode acquisition section sends an instruction of acquiring (providing) operation mode information to the corresponding software part 150 in accordance with the instruction of acquisition of the operation mode input from the mode program registration section 120. The operation mode acquisition section 130 acquires the operation mode information output from the software part 150 in response to the instruction of acquisition, and outputs the operation mode information to the mode program information management section 180.

The job control section 140 acquires the mode program information corresponding to identification information input from an input section (not shown in the figure) from among sets of mode program information retained in the mode program information retaining section 180. Then, the job control section 140 outputs an instruction of execution of a process to the corresponding software part in accordance with the operation mode set to the mode program information output to corresponding software parts based on the mode program information.

The software part 150 includes an operation mode part 160 and a process execution section 170. The operation mode part 160 outputs operation mode information in accordance with the instruction to acquire the operation mode information. The operation mode part 160 includes an operation mode reception section 161 and an operation mode information output section 162.

The operation mode reception section 161 receives the instruction of acquisition of the operation mode information from the operation mode acquisition section 130. The operation mode information output section 162 creates and outputs the operation mode information in accordance with the instruction of acquisition of the operation mode information.

The process execution section 170 performs a process according to the corresponding operation mode in accordance with the instruction of processing from the job control section 140. The process execution section 170 performs a different process for each kind of software parts in response to the process which constitutes the job.

The mode program information management part 180 includes a mode program information management section 181 and a mode program information retaining section 182. The mode program information management section 181 causes the mode program information retaining section 182 to store the operation mode information output from the operation mode acquisition section 130. Additionally, the mode program information management section 181 provides identification information to the operation mode information, and outputs the identification information to the operation mode acquisition section 130. The mode program information management section 181 creates (registers) a mode program by relating the identification information of the operation mode information retained by the mode program information retaining section 182 and the identification information of the mode program to each other for each instruction of creation (registration) of a mode program input from the mode program registration section 120.

The mode program information management section 181 further provides identification information to the created mode program, and outputs the mode program to the mode program registration section 120.

The mode program information retaining section 182 retains the operation mode information, the identification information of the operation mode information and the identification information of the mode program that are output from the mode program information management section 191 by relating to the mode program. These sets of information are referred to as mode program information.

The mode program information retaining section 182 is constituted as, for example, a non-volatile memory. Accordingly, "perpetuation" of the mode program information of the mode program of which setting is designated by an operator can be achieved. It should be noted that the "perpetuation" refers to storage of data in a non-volatile RAM (NVRAM), which is a non-volatile memory, a hard disk apparatus or the like.

(Software Structure (Part 1) for Achieving a Mode Program Function According to the First Embodiment)

Figure 2:
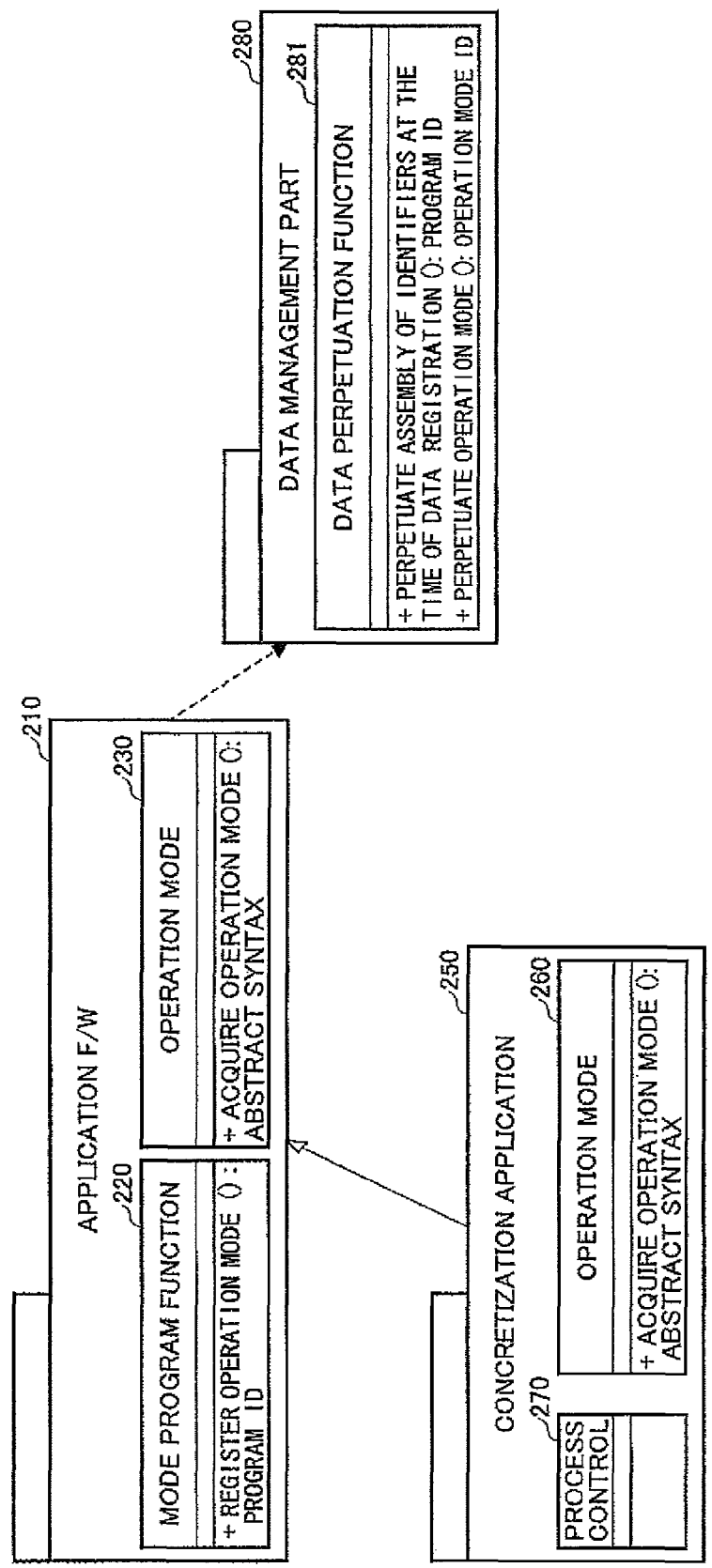
FIG. 2 is a diagram showing a software structure for achieving a mode program function.

FIG. 2 is a structural diagram of software for achieving a mode program function according to the present embodiment. In FIG. 2, an application framework (F/W) 210, a concretization application 250 and a data management part 250 are shown.

The application framework 210 corresponds to the application framework part 110 shown in FIG. 1, the concretization application 250 corresponds to the software part 150 shown in FIG. 1, and the data management part 280 corresponds to the mode program retaining section 180 shown in FIG. 1.

The application framework 210 is a component in which a process common to each application (software part 150) is mounted, and includes a mode program functional class 220 and an operation mode class 230. The mode program functional class 220 corresponds to the mode program registration section 120 shown in FIG. 1. The operation mode class 230 corresponds to the operation mode acquisition section 130 shown in FIG. 1.

The mode program functional class 220 is a class in which a process common to each application with respect to treatment of the mode program is mounted. For example, the mode program functional class 220 registers a mode program, and outputs identification information of the mode program as a return value. The operation mode class 230 is a class in which the process common to each application with respect to treatment of operation mode information is mounted. For example, the operation mode class 230 acquires the operation mode information set to an application, and outputs the operation mode information according to an abstract syntax type mentioned later as a return value.

The concretization application 250 is a component in which a process peculiar to each application is mounted, and includes an operation mode class 260 and a process control class 270. The operation mode class 260 corresponds to the operation mode part 160 shown in FIG. 1. The process control class 270 corresponds to the process execution section 170 shown in FIG. 1.

The operation mode class 260 inherits the operation mode class 230 of the application framework 210, and performs a specific process with respect to acquisition of the operation mode information set to the application. Then, the operation mode class 260 outputs the operation mode information, which is upcasted to an abstract syntax type mentioned later, as a return value thereof. The process control class 270 performs an execution control of the job.

The data management part 280 is a component which manages entire data, and includes a data perpetuation function class 281. The data perpetuation function class corresponds to the mode program information management section 181 shown in FIG. 1. The data perpetuation function class 281 performs perpetuation of the operation mode information and the mode program information. The identification information may be provided and output for each operation mode information and mode program information to be perpetuated.

(Data Structure of Operation Mode Information)

Figure 3:
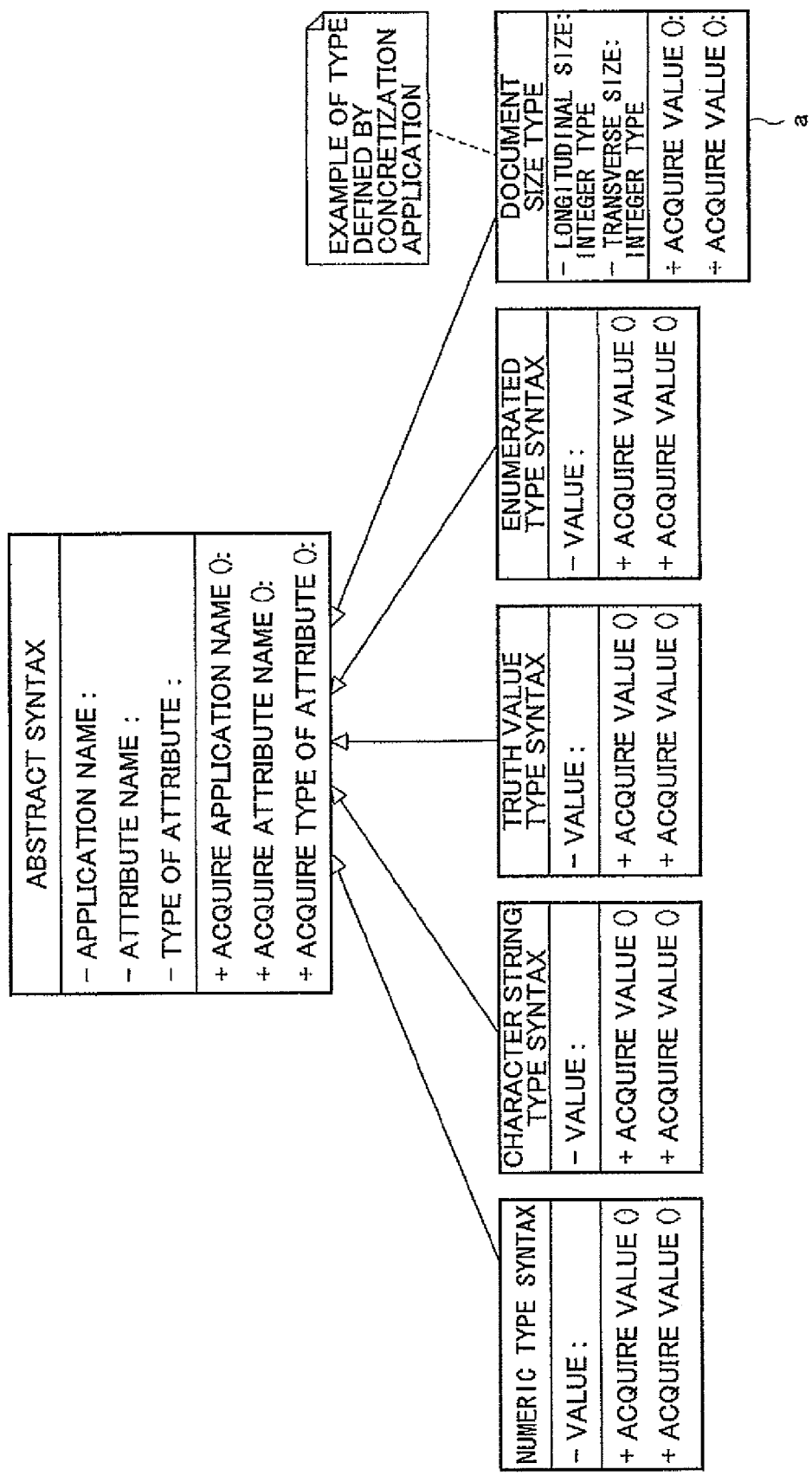
FIG. 3 is a class diagram for explaining a data structure of operation mode information.

A description will now be given of a data structure of the operation mode information. FIG. 3 is a class diagram for explaining an example of a data structure of the operation mode information. In the explanation of FIG. 3, the "class" given at the end of each designation, which distinguishes each class, is omitted. In FIG. 3, a numeric type syntax, a character string type syntax, a truth value type syntax, and an enumerated type syntax are generalized by an abstract syntax. Additionally, the numeric type syntax, the character string type syntax, the truth value type syntax, and the enumerated type syntax inherit the abstract syntax.

Each of the numeric type syntax, the character string type syntax, the truth value type syntax, and the enumerated type syntax is a concretization class, which represents operation mode information. That is, the operation mode information is handled as an instance of one of the classes in accordance with the data type of the value thereof. Each of these classes has an operation (method) for setting or acquisition of the value of the setting item.

The abstract syntax is an abstract class which represents the operation mode information. By defining the abstract syntax, the application framework 210 can handle each operation mode information (instance of each concretization class), which may be a different data type (concretization class), in common by upcasting it to the abstract type syntax. The abstract type syntax has three attributes, an application name, an attribute name and a type of attribute. The application name is a designation for identifying the concretization application 250 (software part 150), and is, for example, an individual designation of each software part. The concretization application 250 performs a process which constitutes one job. Therefore, an application name of the concretization application 250, which executes a copy job is, for example, "copy application".

The attribute name is a designation of a setting item, and is, for example, "number of copies", "resolution" or "document size". The type of attribution is a data type of the setting item. Because an example in which the numeric type, the character string type, the truth value type, the enumerated type, and the document size type are defined is shown in FIG. 3, a value which indicates one of these types is set up.

FIG. 3 shows examples of the types defined by the concretization application 250. A type indicated by (a) in FIG. 3 has an attribute name "document size", and has a type of attribute that a longitudinal size and a transverse size are "integer type". Here, the information, which identifies the concretization application 250, is included in the abstract syntax. Thereby, the concretization application 250 can be specified by the abstract syntax later.

It should be noted that when the data type defined by the concretization application 250 has a complicated structure and it is difficult to perpetuate, the data type corresponding to the Collection in the Standard Template Library (STL) such as Lis or Set is defined beforehand in the application framework 210, and an object which can be perpetuated may be defined by achieving a hierarchical data structure.

Figure 4:
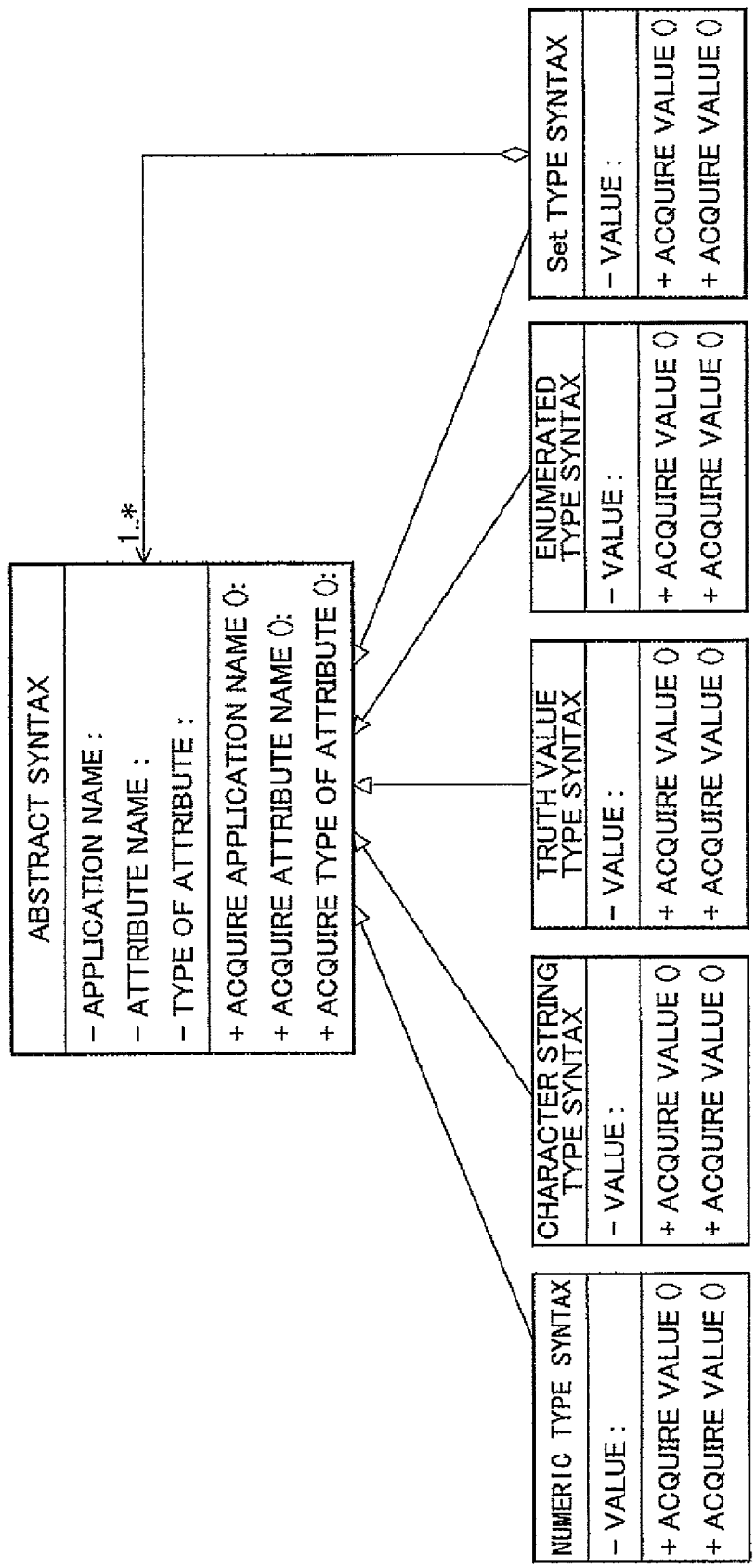
FIG. 4 is a class diagram showing a data type for achieving a hierarchical structure.

For example, FIG. 4 is a class diagram showing examples of data types, which realizes a hierarchical structure. In FIG.

4, a Set type syntax is added. The Set type syntax is a class (data type), which can store all classes (data types) inheriting an abstracted type syntax.

Figure 5:
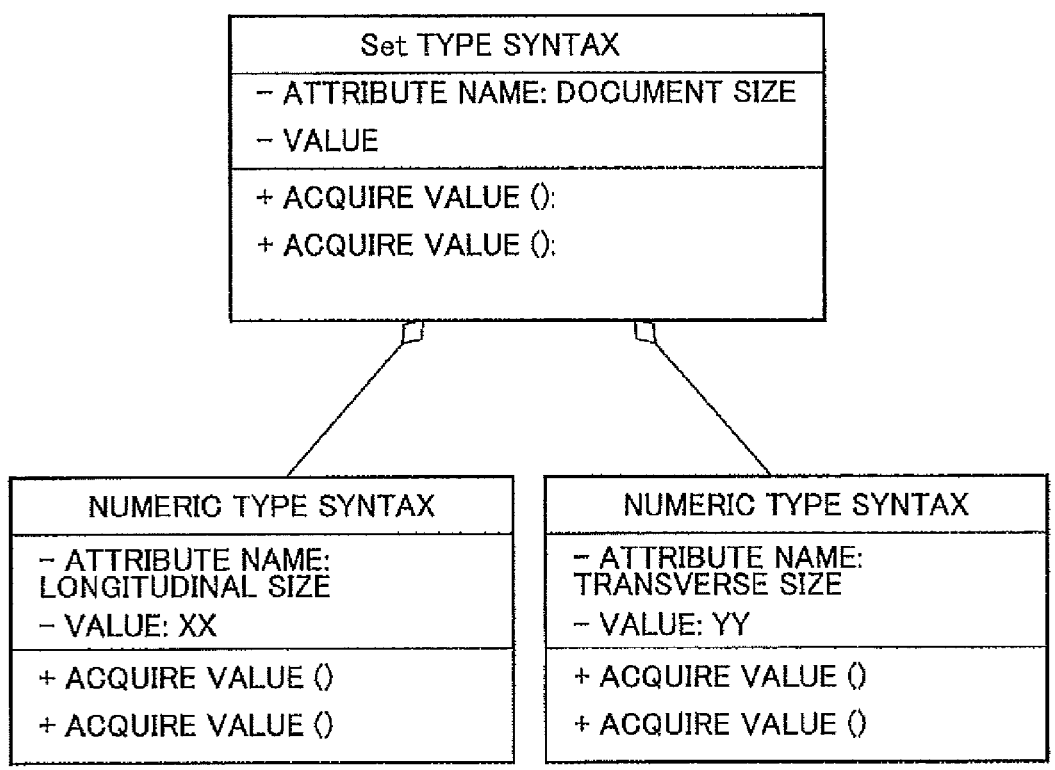
FIG. 5 is an illustration of a representation of a document size type using a Set-type syntax.

If the document size type in FIG. 3 is replaced by the Set type syntax, the data structure is changed to the example shown in FIG. 5. In FIG. 5, the document size type is represented using the Set type syntax.

In FIG. 5, the Set type syntax to which "document size" is set as an attribute name stores two numeric type syntaxes corresponding to a longitudinal size and a transverse size. It should be noted that the hierarchical structure can be constituted freely by combining the Collection classes, such as storing a Set type syntax in another Set type syntax etc. Thereby, a data type peculiar to the concretization application 250 can be defined by a combination of data types in the application frame 210. Therefore, the necessity of mounting a special process for handling the peculiar data type in the concretization application 250 can be eliminated. It should be noted that the instances of the classes shown in FIGS. 3 and 4 are generally referred to as a "syntax object".

A description will be given below of a process procedure executed by the image forming apparatus 100.

(Example of a Process of Displaying a Setting Screen of an Application)

Figure 6:
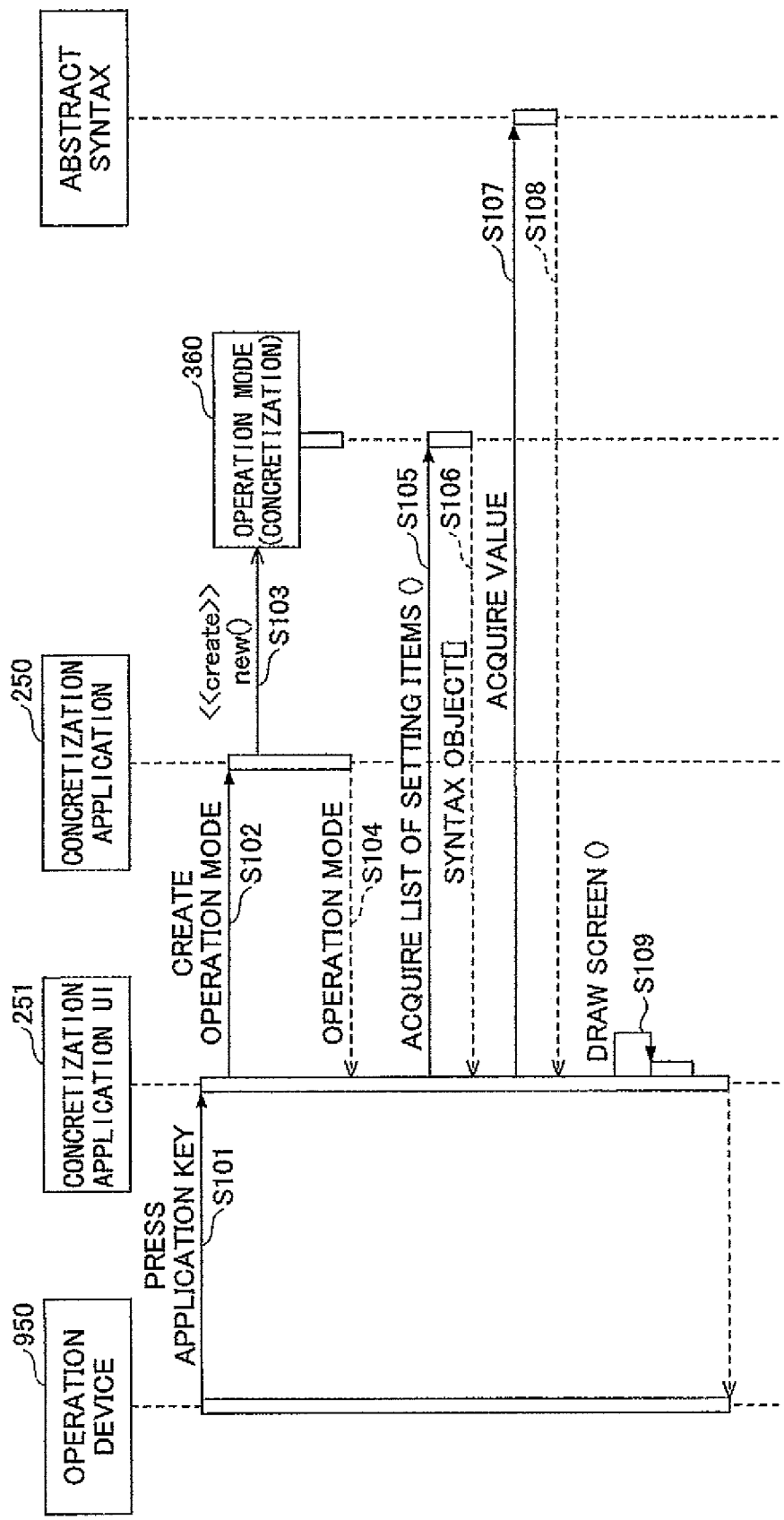
FIG. 6 is a sequence chart of a process for displaying a setting screen of an application.

FIG. 6 is a sequence chart of an example of a process of displaying a setting screen of an application. In FIG. 6, an operation device 950 is a device (for example, an operation panel) including an input section and a display section provided in the image forming apparatus 100. Additionally, a concretization application UI 251 is a portion, which performs an input-and-output control to the operation device 950 in the concretization application 250. It should be noted that each object in the sequence chart of FIG. 6 is an instance of the class of the same name in FIG. 2.

Figure 7:
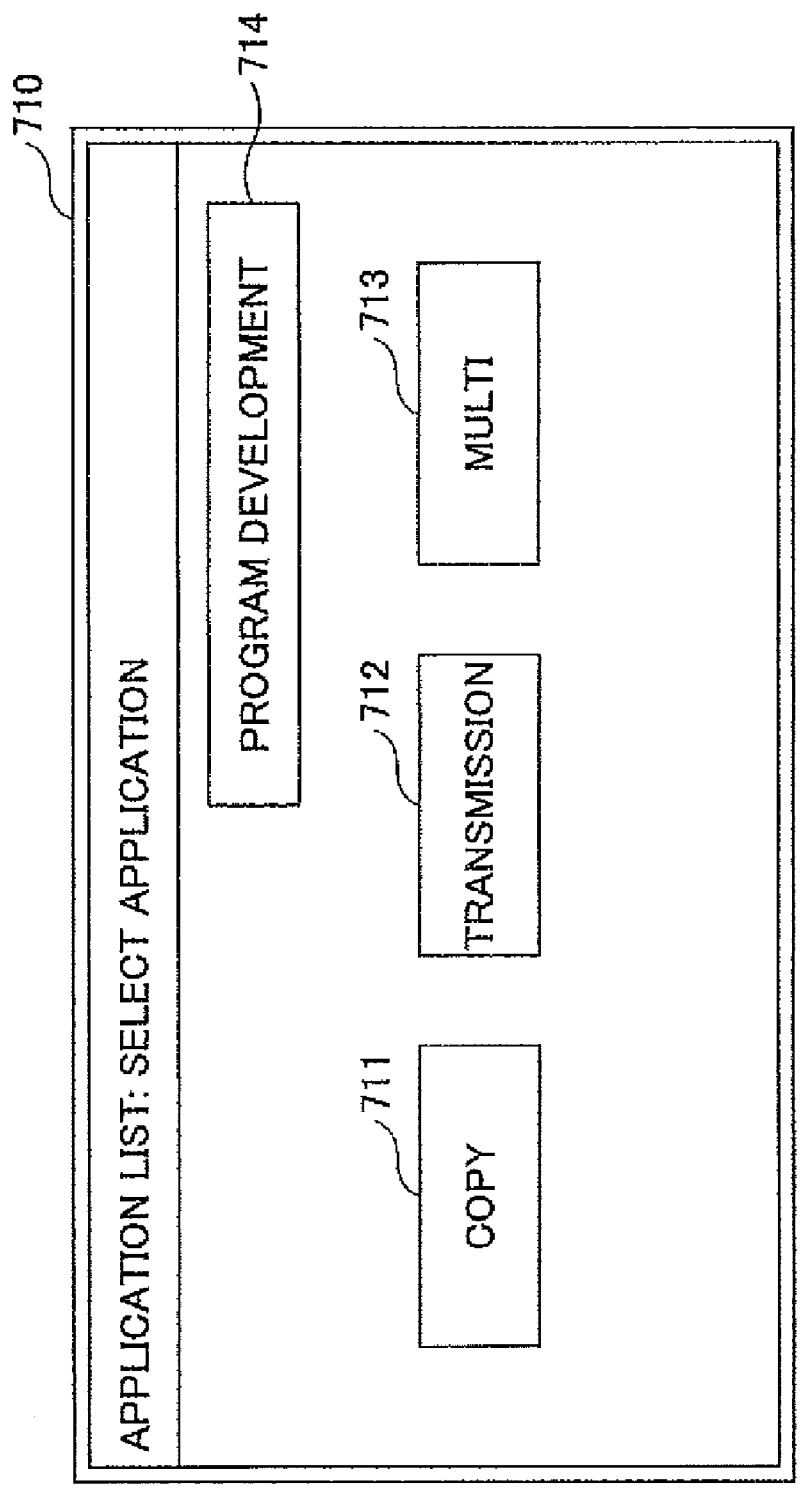
FIG. 7 is a display of an application list screen.

When the image forming apparatus 100 is started, an application list screen is displayed on the operation device 950. FIG. 7 is an illustration of a display of the application list screen. In the application list screen 710 shown in FIG. 7, there are arranged a copy button 711, a transmission button 712, an application selection button such as a multi-button 713, and a program development button 714. The application selection button is a button for selecting an application to be used. The program deployment button 714 will be explained later.

In step S101, an arbitrary application selection button (here, it is supposed to be the copy button 711) in the application list screen 710 is pressed down so that the application UI 251 corresponding to the copy button 711 is called. Proceeding to step S102, the application UI 251 requests the concretization application 250 corresponding to a copy application to create an operation mode object 360. Then, in step S103, the concretization application 250 creates the operation mode object 360, and outputs the operation mode object 360 concerned to the concretization application UI 251 in step S104. It should be noted that, when creating the operation mode object 360, an initial value of each setting item with respect to the copy application is set to the operation mode object 360.

Subsequent to step S104, the concretization application UI 251 acquires a list of setting items from the output operation mode object 360 (a list of syntax objects) in steps S105 and S106. The list of syntax objects acquired here is an arrangement of abstract syntax classes, and each syntax object is made into an instance according to classes corresponding to the attribute types thereof (refer to FIG. 3).

In steps S107 and S108, the concretization application UI 251 acquires a value (here, an initial value) from each acquired syntax object. The concretization application UI 251 casts the syntax object to a class corresponding to a type of attribute of the syntax object concerned, and acquires a value from the instance of the cast class. Accordingly, a value corresponding to the data type of each setting item can be acquired. Subsequently, the concretization application UI 251 displays the setting screen of the copy application in accordance with the attribute name of each syntax object and each initial value.

Figure 8:
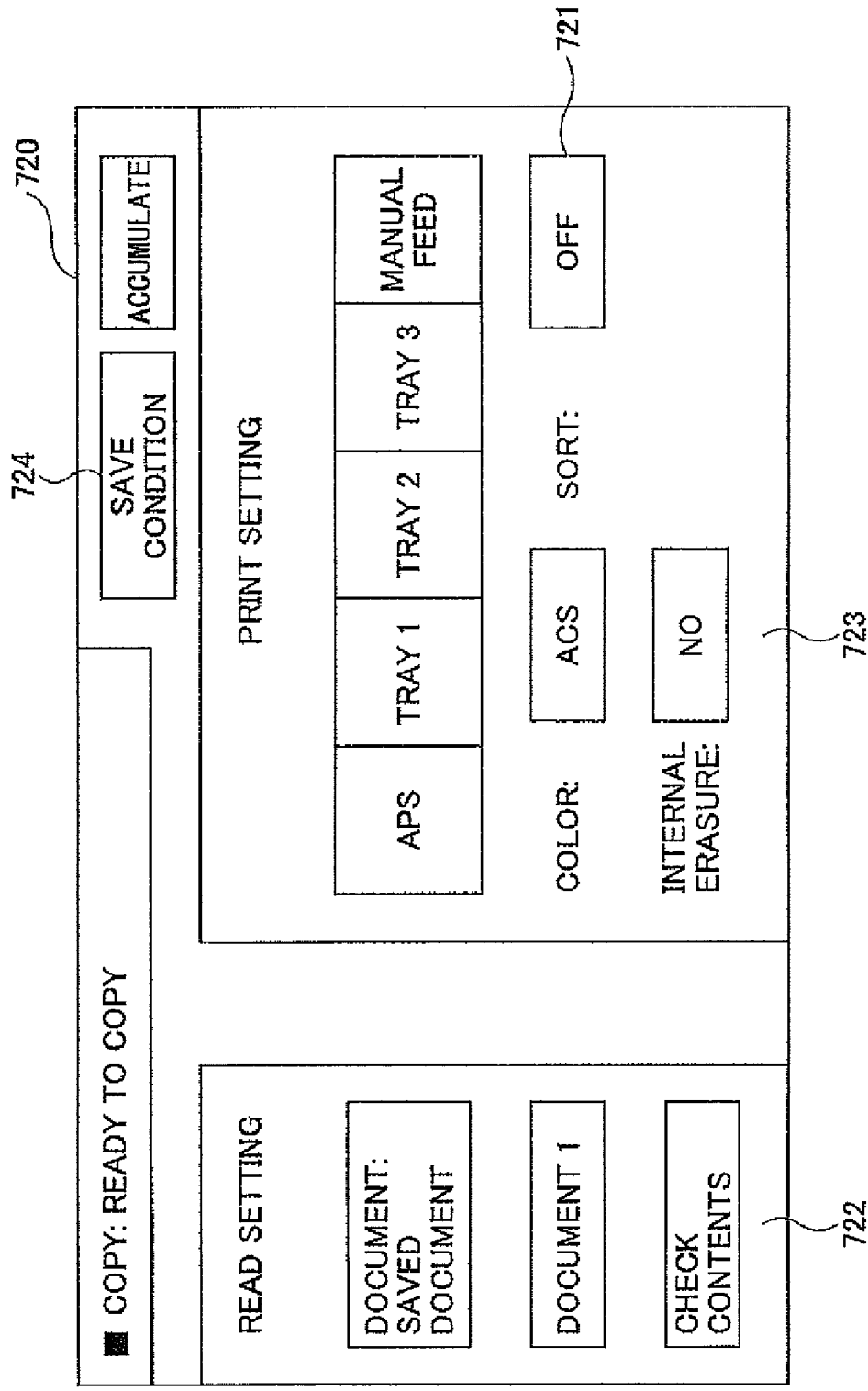
FIG. 8 is a display of a setting screen of a copy application.

FIG. 8 shows an example of display of the setting screen of the copy application. An initial value with respect to each setting item of the copy application is displayed on the setting screen 720 shown in FIG. 8.

(Example of a Process of Setting Operation Mode Information)

Figure 9:
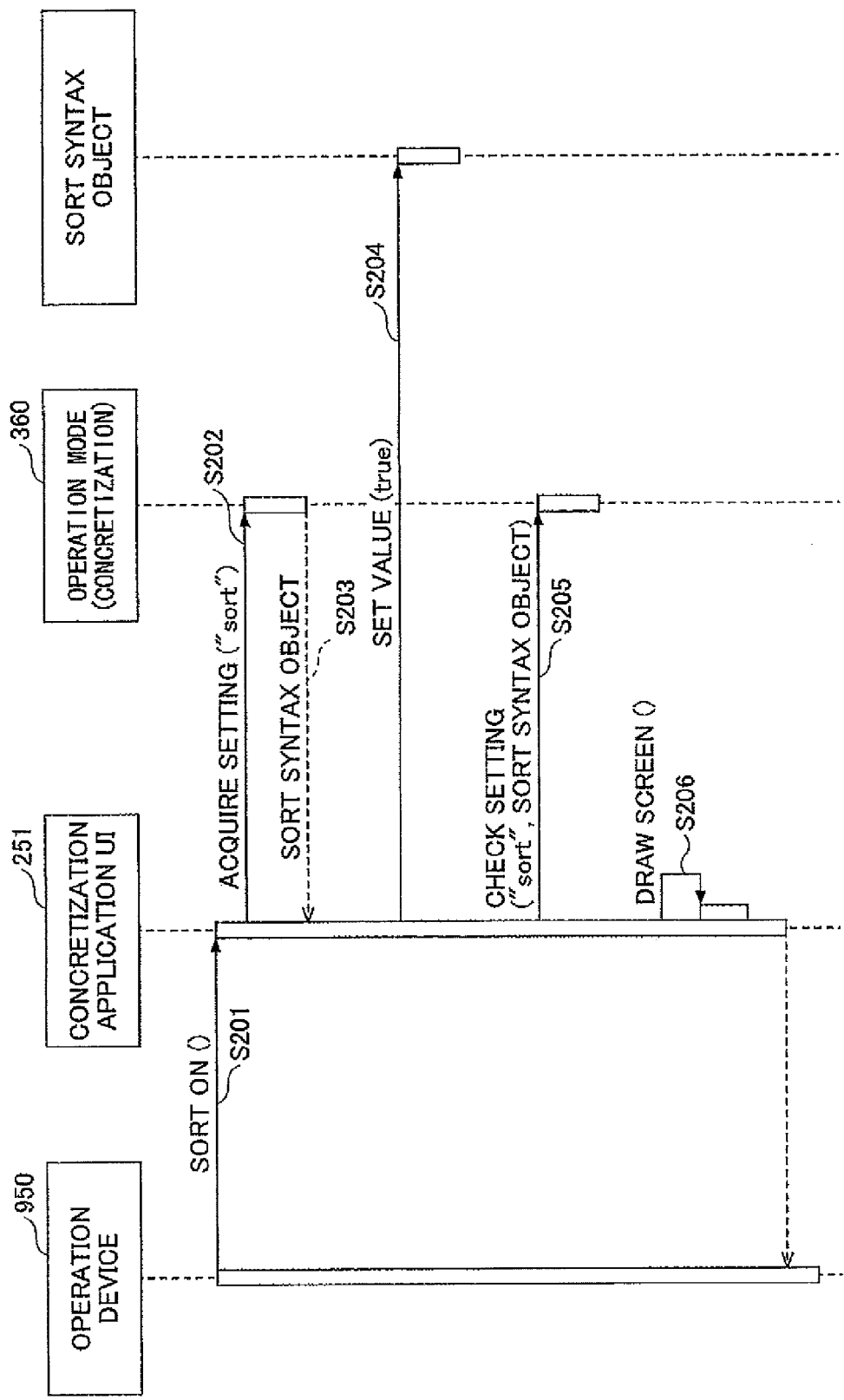
FIG. 9 is a sequence chart of a process for setting an operation mode.

Then, the operation mode (value of each setting item) is set by an operator through the setting screen 720. FIG. 9 is a sequence chart of a process of setting an operation mode. Referring to FIG. 9, an example of setting necessity (ON/OFF) of sorting with respect to a copy application is explained. It should be noted that each object in the sequence chart of FIG. 9 is an instance of the same name shown in FIG. 2.

In step S201, the sort button 721 is pressed by an operator in the setting screen 720, and the concretization application UI 251 of the copy application is notified of the fact that the sort is set to ON. Proceeding to step S202, the concretization application UI 251 requests acquisition of a syntax object (hereinafter, referred to as "sort syntax object" corresponding to the setting item of sort to the operation mode object 360 of the copy application by using "sort" as a key. Proceeding to step S203, the operation mode object 360 searches for a syntax object of which attribute name is "sort", and outputs the syntax object (sort syntax object) to the concretization application UI 251. It should be noted that although the sort syntax object is an instance of the truth value type syntax class, it is output as an abstract syntax class.

Proceeding to step S204, the concretization application UI 251 casts the output sort syntax object to a truth value type syntax class in accordance with the type of attribute thereof, and sets a value (here, "true") to the cast sort syntax object. Proceeding to S205, the concretization application UI 251 sets the sort syntax object, to which the value (true) was set, to the operation mode object 360. Thereby, the sort syntax object is updated in the operation mode object 360. Proceeding to step S205, the concretization application UI 251 updates the display state of the setting screen 720.

Figure 10:
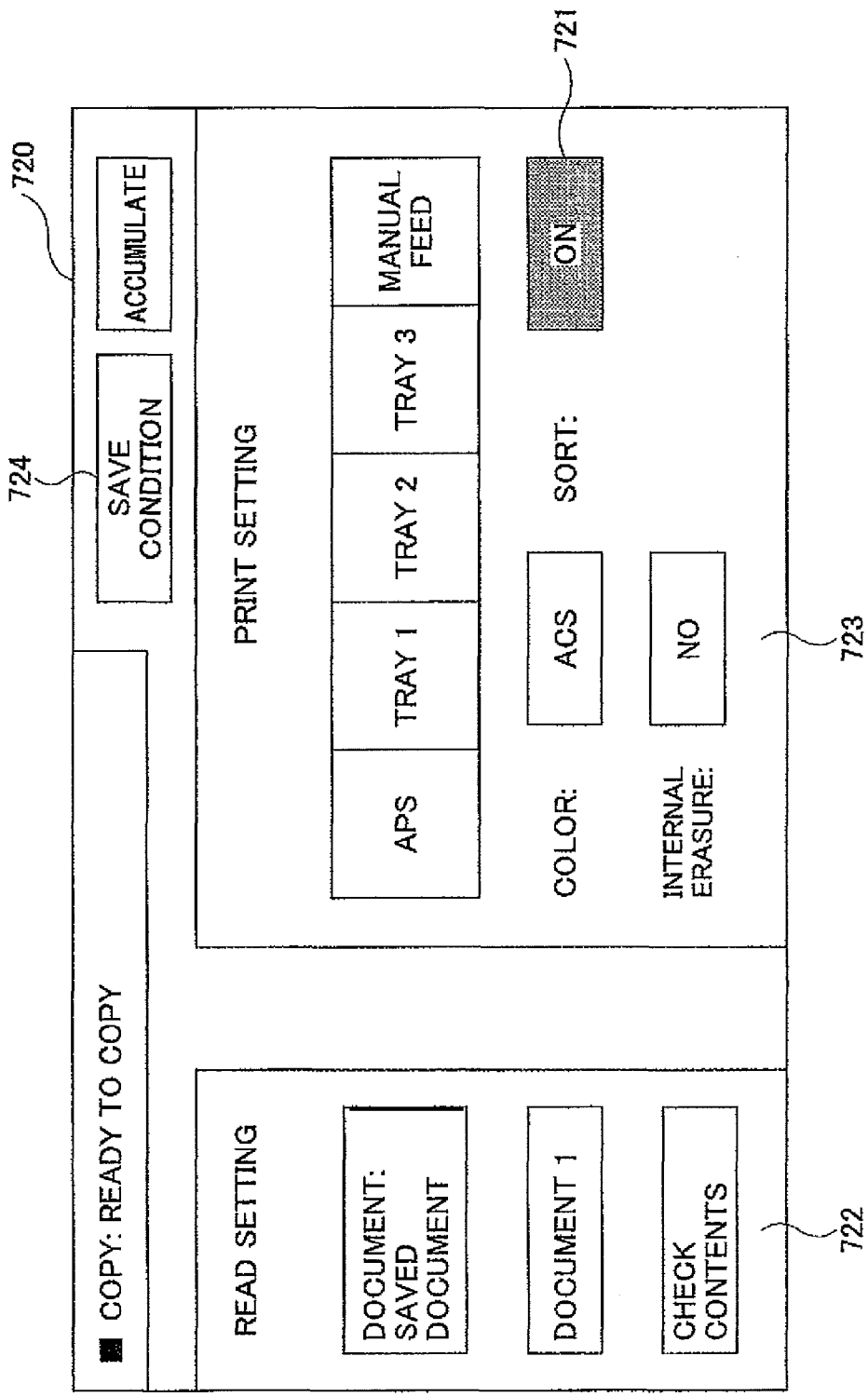

FIG. 10 is an illustration of a setting screen of a copy application after "sort" is set to ON. In the setting screen 720 of FIG. 10, "ON" is indicated-in the sort button 721.

(Example of a Process of Executing a Job)

Figure 11:
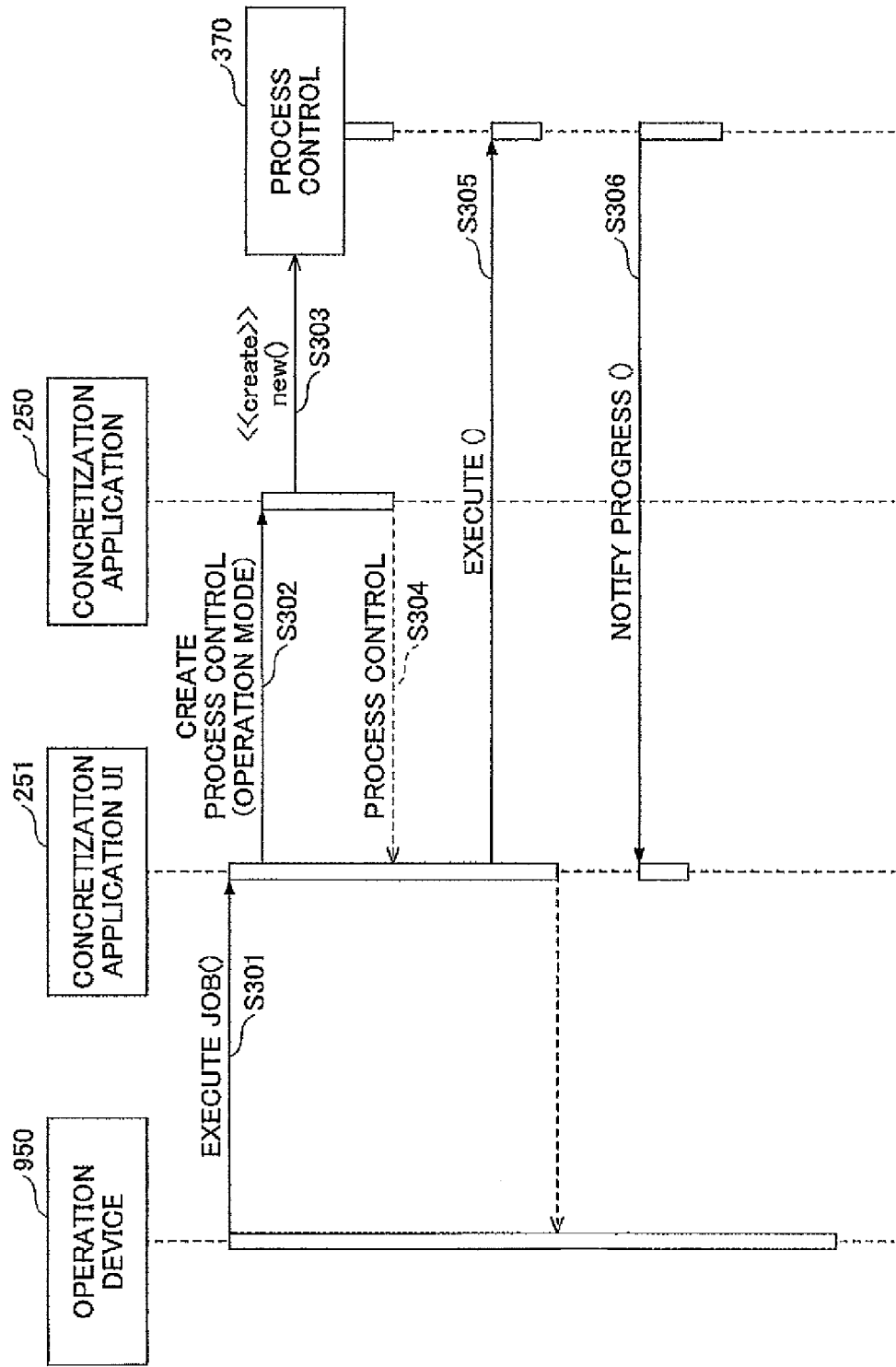
FIG. 11 is a sequence chart of a process for executing a job.

FIG. 11 is a sequence chart of a process of executing a job. Each object in the sequence chart of FIG. 11 is an instance of a class of the same name shown in FIG. 2.

In step S301, an execution of the job is instructed by an operator through the operation device 950 after the setup of the operation mode through the setting screen 720, and a notification of the instruction is sent to the concretization application UI 251. Proceeding to step S301, the concretization application UI 251 requests the concretization application 250 (copy application) to create a process control object 370 for controlling the job by designating as an argument the operation mode object 360 of the copy application (namely, the operation mode object 360 to which the operation mode information is set). Proceeding to step S303, the concretization application 250 creates the process control object 370 of the copy application, and sets the operation mode object 360 to the process control object 370 concerned. Proceeding to step S304, the concretization application 250 outputs the created process control object 370 to the concretization application UI 251.

Proceeding to step S304, the concretization application UI 251 requests the process control object 370 to execute the job. In response to the request, the process control object 370 executes the job (copy job) in accordance with the operation mode based on the set-up operation mode object 360. Thereafter, the process control object 370 notifies the application UI 251 of the progress (for example, a completion of the job) in step S306.

(Example of a Process of Registering a Mode Program)

Figure 12:
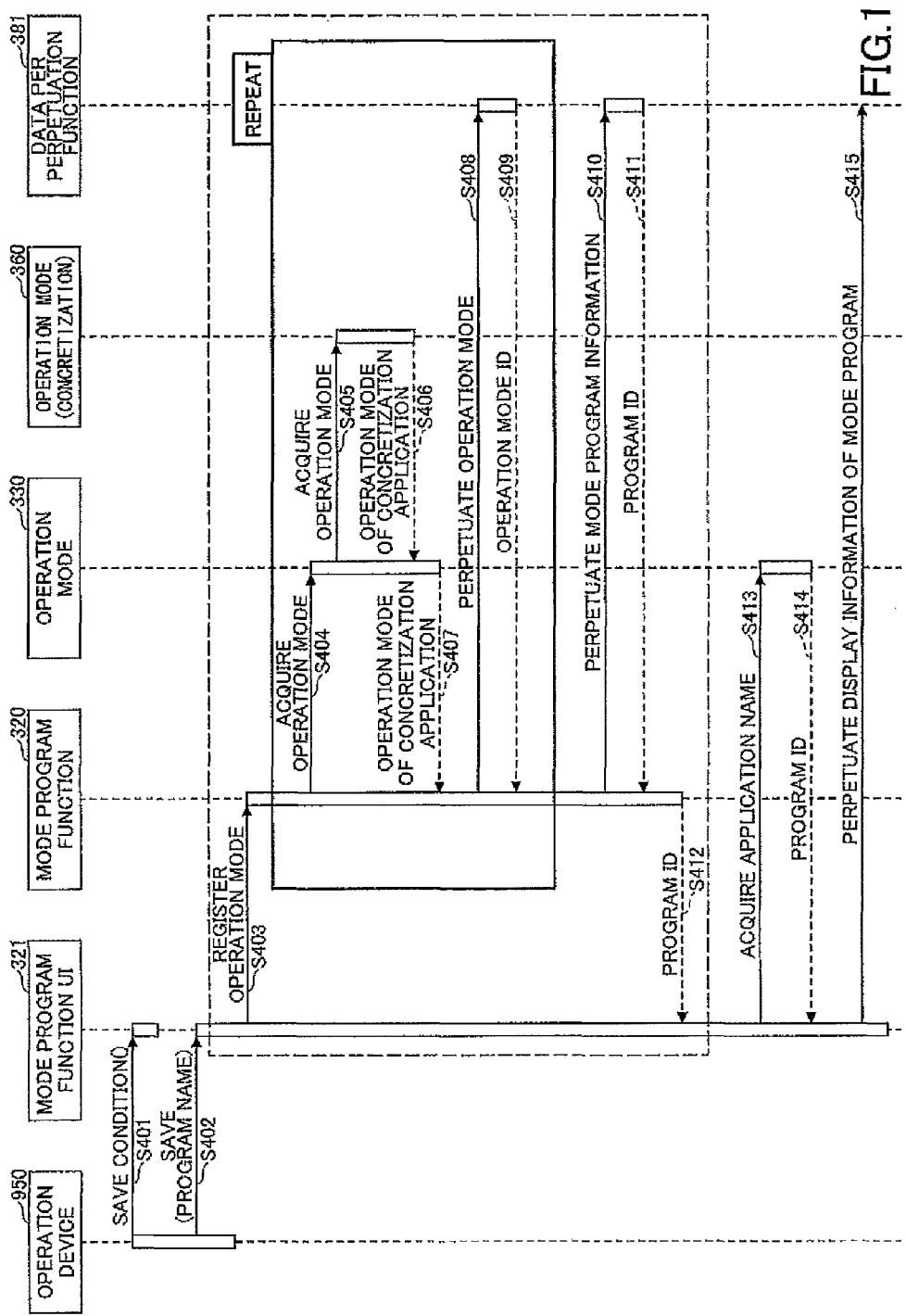
FIG. 12 is a sequence chart of a process for registering a mode program.

FIG. 12 is a sequence chart of a process of registering a mode program. Each object in the sequence chart of FIG. 12 is an instance of a class of the same name shown in FIG. 2.

In step S401, after the setup of the operation mode is completed (namely, after the process of FIG. 9), the condition save button 724 is pressed by an operator in the setting screen 720, and a notification of the pressing of the save button 724 is sent to the mode program function UI 321. The mode program function UI 321 is software, which performs an input-and-output control of the operation device 950 with respect to the mode program function. The mode program function UI 321 displays a mode program registration screen on the operation device 950 according to the notification concerned.

Figure 13:
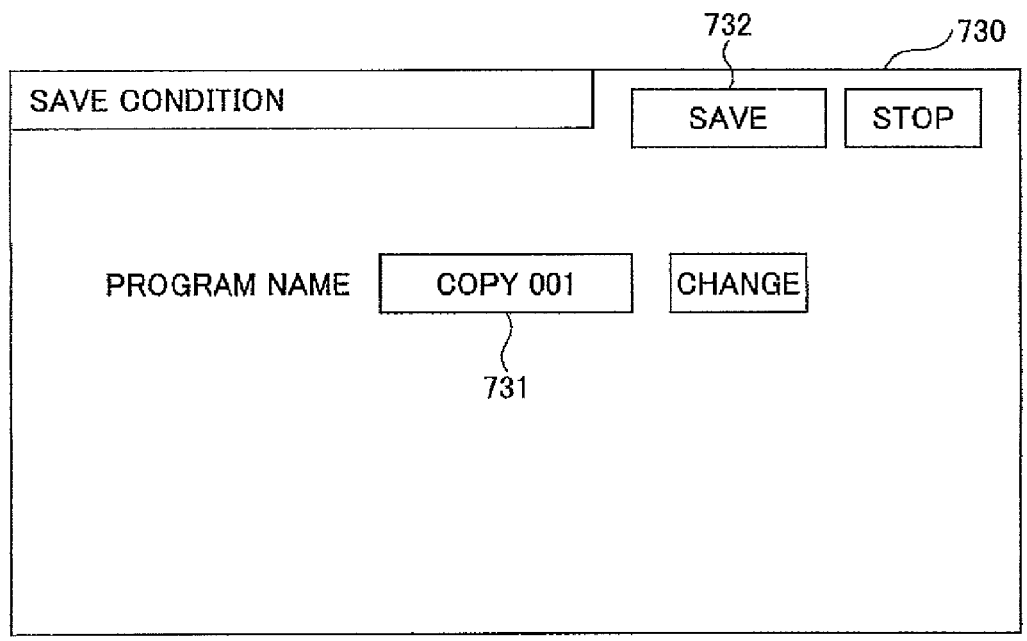
FIG. 13 is a display of a mode program registration screen.

FIG. 13 is an illustration of an example of a mode program registration screen. In FIG. 13, the mode program registration screen 730 has a program name input area 731 and a save button 732.

In step S402, the name (program name) of the mode program, which is made to be a registration object, is input to the program name input area 731 of the mode program registration screen 730, and the save button 732 is pressed. Proceeding to step S403, the mode program function UI 321 requests the mode program function object 320 to register the mode program by using the input program name ("copy 001" in the example of FIG. 13) as an argument. Proceeding to step S404, an instruction to acquire operation mode information (syntax object) regarding one of the setting items is output from the mode program functional object 320 to the operation mode object 330.

Proceeding to step S405, an instruction to acquire the operation mode information with respect to one of the setting items is output from the operation mode object 330 to the operation mode object 360. Proceeding to step S406, the syntax object of the abstract syntax class with respect to one of the setting items is output from the operation mode object 360 to the operation mode object 330.

It should be noted that the information output here may have a form of a container such as, for example, a link list. Thereby, the operation mode object 330 can acquire at once the syntax objects with respect to all the setting items that constitute operation mode information.

Proceeding to step 3407, one syntax object is output from the operation mode object 330 to the mode program functional object 320. Proceeding to step S408, an instruction to perpetuate the acquired syntax object is output together with the syntax object from the mode program functional object 320 to the data perpetuation function object 381. The mode program function object 320 stores the operation mode information stored in the syntax object concerned in the non-volatile memory.

FIG. 14 is an illustration showing a perpetuation form of operation mode information. An operation mode ID is assigned to the perpetuated operation mode information as shown in FIG. 14. The operation mode ID is identification information of each operation mode information which is perpetuated, and is assigned when the perpetuation of the operation mode information is carried out. It should be noted that the perpetuation of the operation mode information may be carried out by, for example, serialization.

Proceeding to step S409, the operation mode ID assigned to the perpetuated operation mode information is output from the data perpetuation function object 381 to the mode program function object 320 is output.

The process from step S404 to step S409 is performed on each setting item. Therefore, the perpetuation of the syntax object of each setting item is carried out, and the operation mode IDs assigned to the syntax objects concerned are collected by the mode program function 320.

Proceeding to step S410, the mode program function object 320 requests the data perpetuation function object 381 to perpetuate the mode program information by using the collected operation mode ID as an argument. In response to the request, the data perpetuation function object 381 causes the non-volatile memory to store the mode program information.

FIG. 15 is an illustration showing a perpetuation form of the mode program information. As, shown in FIG. 15, the mode program information is constituted by an assembly of the program ID and the operation mode ID. The program ID is identification information assigned for each registered mode program. That is, the mode program information is the information for relating the mode program and the operation mode ID to each other.

Proceeding to step S411, the program ID assigned to the mode program to be registered is output from the data perpetuation function object 381 to the mode program function object 320. Proceeding to step S411, the mode program function object 320 outputs the program ID concerned to the mode program function UI 321.

Subsequent to step S412, the mode program function UI 321 acquires the application name (for example, "copy application") from the operation mode object in steps S413 and 3414. Proceeding to step S415, the mode program function UI 321 outputs the program ID, the application name and the program name to the data perpetuation function object 381. The data perpetuation function object 381 causes the non-volatile memory to store the information as mode program display information.

FIG. 16 is an illustration showing a perpetuation form of the mode program display information. The mode program display information is used as display information at the time of having the operator to choose the mode program to be an object to use. The date is year, month and day when it is perpetuated.

It should be noted that the mode program display information or the mode program information (FIG. 15) may be associated with the operator's identification information. Thus, the registered mode program can be distinguished for each operator by this, which improves convenience of use.

(Example of a Process of Developing a Mode Program)

Figure 17:
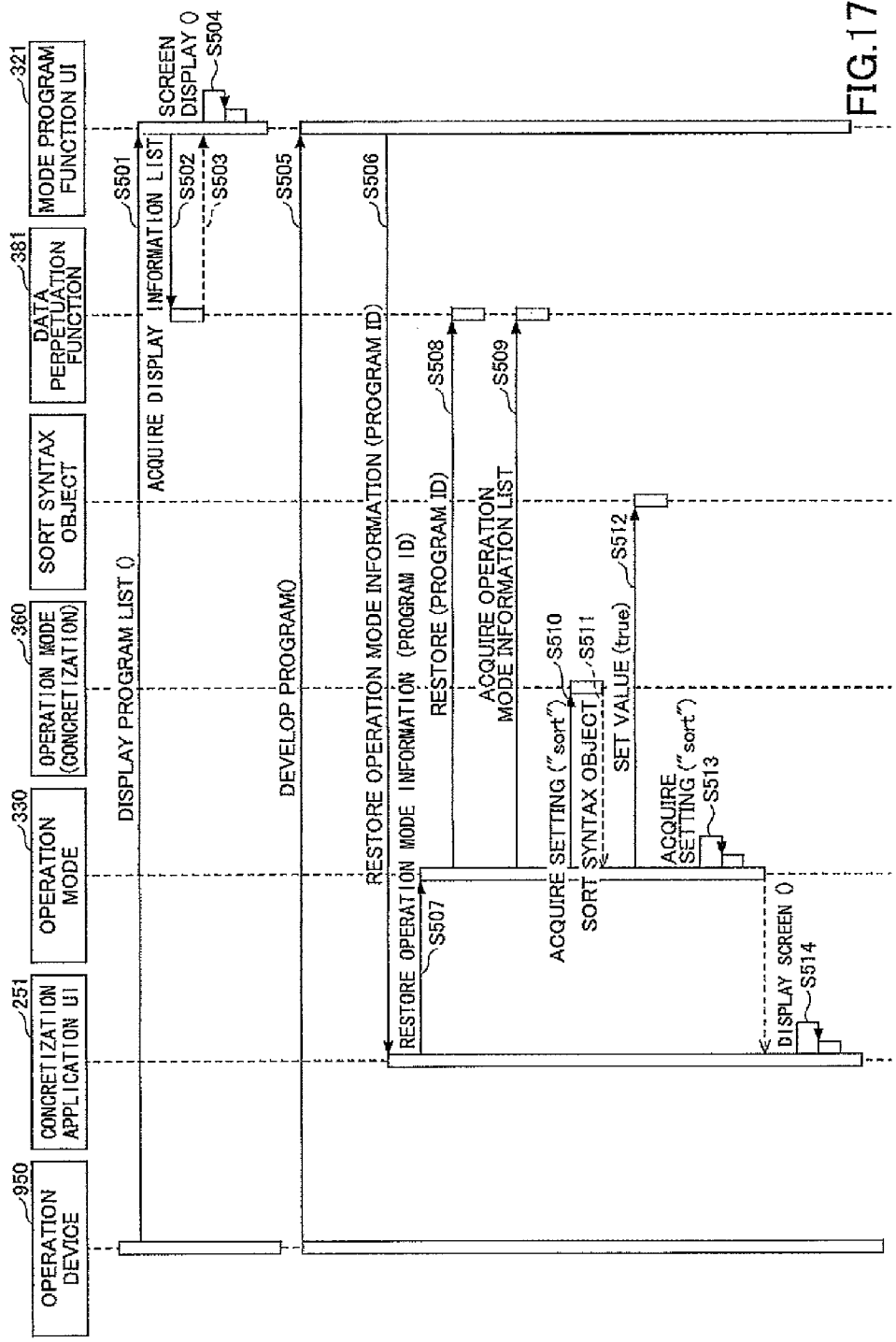
FIG. 17 is a sequence chart of a process for developing a mode program.

FIG. 17 is a sequence chart of a process of developing a mode program. Each object in the sequence chart of FIG. 17 is an instance of a class of the same name shown in FIG. 2. The development of the mode program refers to call out or retrieval of the mode program to use.

In step S501, the program development button 714 is pressed down in a state where the application list screen 710 (refer to FIG. 7) is displayed on the operation device 950, and an instruction to display of a list of mode programs is sent to the mode program function UI 321. Proceeding to steps S502 and S503, the mode program function UI 321 acquires the list of mode program display information from the data perpetuation function object 381. Proceeding to step S504, the mode program function UI 321 causes the operation device 950 to display the mode program list screen in accordance with the list of the acquired mode program display information.

Figure 18:
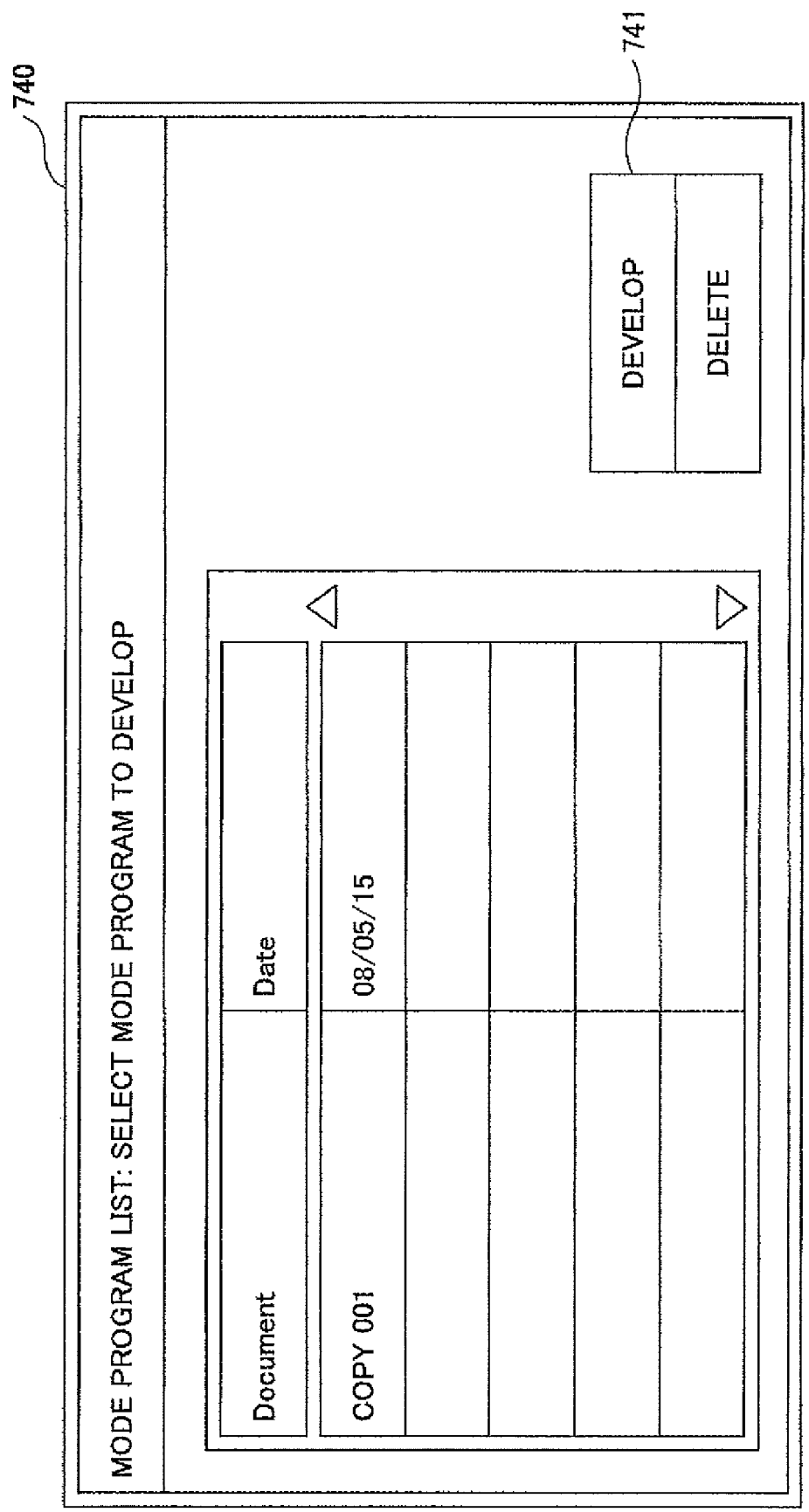
FIG. 18 is a display of a mode program list screen.

FIG. 18 is an illustration showing a display of the mode program list screen. As shown in FIG. 18, a list of the program name of the mode program registered and the dates are displayed on the mode program list screen 740.

In step S504 subsequent to step S505, a mode program to be an object to be developed is selected by an operator in the mode program list screen 740, and the development button 741 is pressed. Proceeding to step S506, the mode program function UI 321 requests the concretization application UI 251 associated with the selected mode program (here, a copy application) to restore the operation mode information. At that time, the program ID of the selected mode program is designated. It should be noted that the application and the program ID associated with the selected mode program are determined based on the mode program display information.

Proceeding to step S506, the application UI 251 designates the program ID and requests the operation mode object 330 to restore the operation mode information. Proceeding to step S508, the operation mode object 330 acquires a set of the operation mode IDs related with the program ID concerned in the perpetuated program information (refer to FIG. 15) from the data perpetuation function object 381. Proceeding to step S509, the operation mode object 330 acquires from the data perpetuation function object 381 the operation mode information corresponding to the acquired operation mode ID from among the sets of perpetuated operation mode information (refer to FIG. 14).

Proceeding to steps S510 and S511 subsequent to step S509, the operation mode object 330 acquires a syntax object with respect to each setting item from the operation mode object 360. FIG. 17 shows an example in which a syntax object (sort syntax object) with respect to sorting is acquired. Proceeding to step S512, the operation mode object 330 sets a value included in the operation mode information acquired in step S510 with respect to the acquired sort syntax object. Proceeding to step S513, the operation mode object 330 sets the sort syntax object of which value is updated (the perpetuated value is set) to the operation mode object 330. Thereby, the contents of the setting with respect to the sorting are restored as the value which has been perpetuated as the mode program. It should be noted that steps S510 to S513 are performed for each of the other setting items.

Proceeding to step 3513, the concretization application UI 251 displays the setting screen 710 of the copy application in accordance with the operation mode object 330. Under the present circumstances, the setting state in the setting screen 710 becomes one corresponding to the operation mode information which has been registered with respect to the mode program. Therefore, by the process of FIG. 11 being performed in this state, the job is performed in accordance with the mode program.

(Structure of Software Performing a Mode Program Function of the First Embodiment (Part 2))

Figure 19:
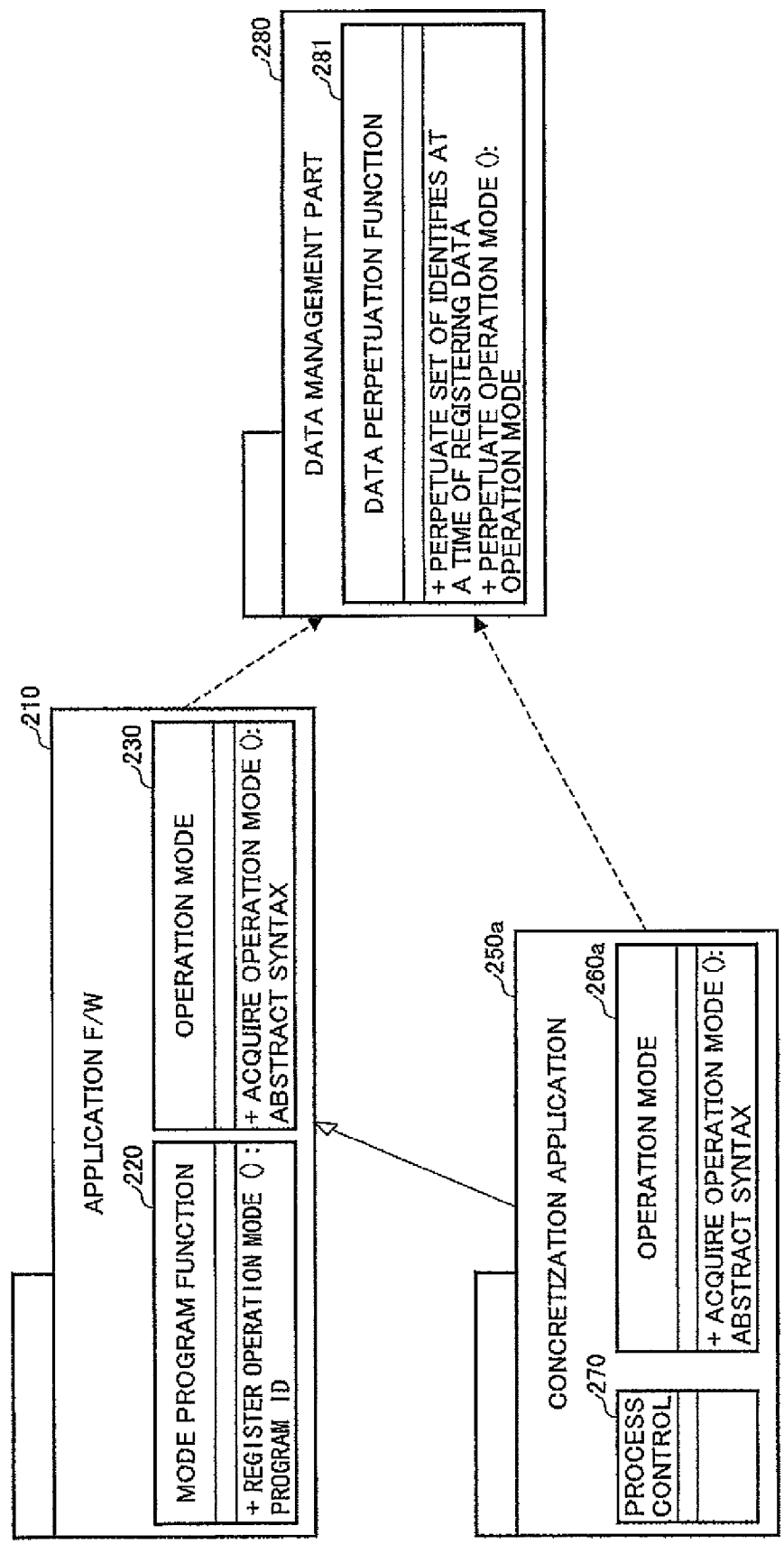
FIG. 19 is a diagram showing a software structure for achieving a mode program function.

FIG. 19 is a structure diagram of software performing a mode program function of the present embodiment. In the example of FIG. 19, a class having a function different from that of FIG. 2 is included. In FIG. 19, parts that are the same as the parts shown in FIG. 2 are given the same reference numerals, and descriptions thereof will be omitted.

An operation mode class 260a contained in a concretization application 250a of FIG. 19 outputs the operation mode information expressed by an abstract syntax, similar to the operation mode class 260 of FIG. 2, in response to an instruction of acquisition of the operation mode information. However, if a predetermined condition is fulfilled, the operation mode class 260a outputs the operation mode information to the data perpetuation function object 381 to instruct perpetuation.

The case where the predetermined condition is fulfilled is that, for example, when a round error is generated if cast directly to the "integer type", the "character string type", the "truth value type" or the "enumerated type" in a case where the operation mode class 260a cannot inherit the abstract syntax class. It should be noted that the case where the abstract syntax class cannot be inherited is when a class other than the syntax class is inherited such as, for example, in a case where the concretization application 250a is mounted according to the JAVA (registered trademark) language. This may occur due to inhibition of multiplex succession in the regulation of the JAVA (registered trademark) language.

(Process in a Case of Performing Perpetuation on a Concretization Application Side)

Figure 20:
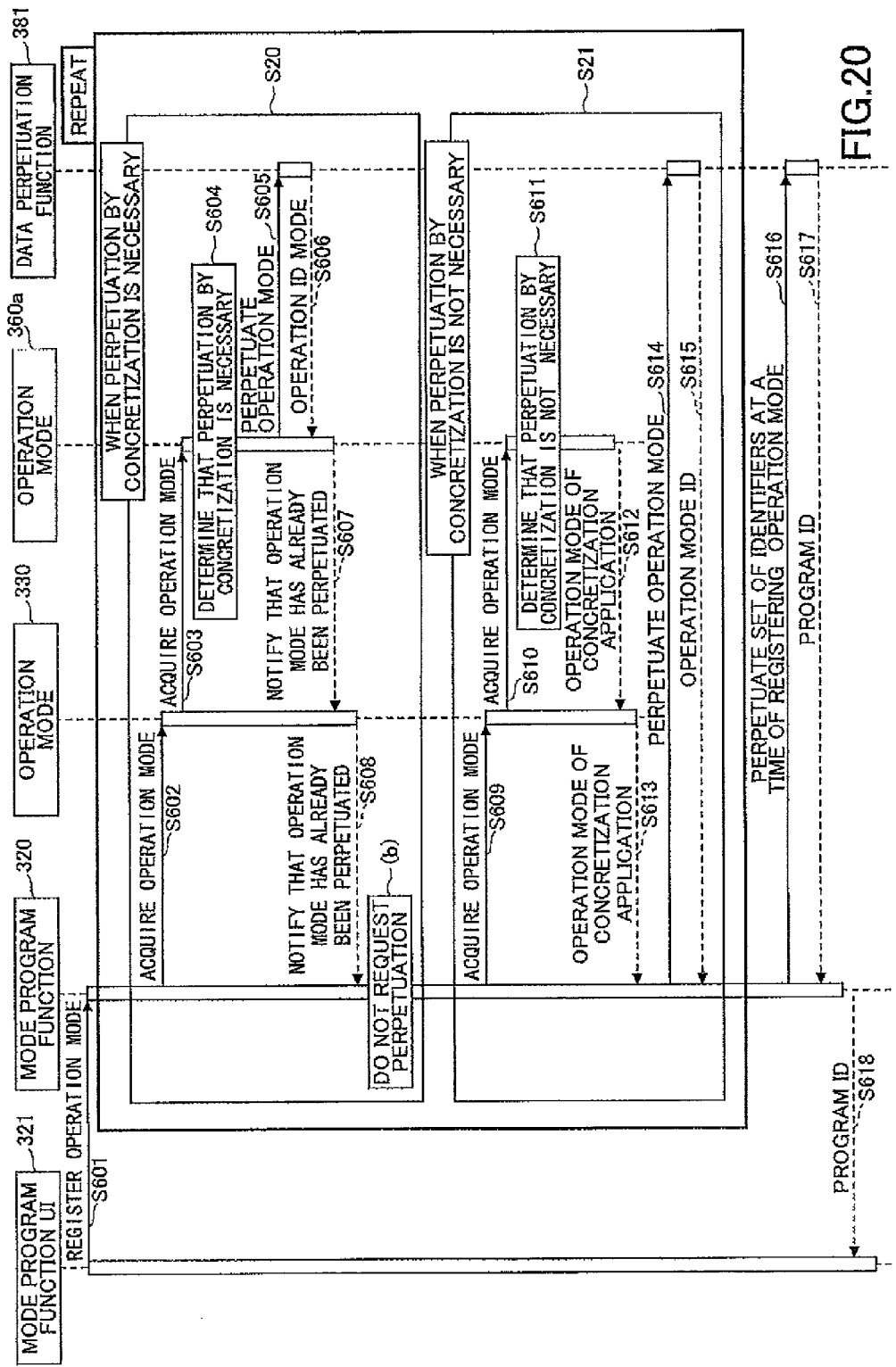
FIG. 20 is a sequence chart of a process in a case where perpetuation is carried out by a concretization application.

FIG. 20 is a sequence chart of a process when perpetuation is carried out by the operation mode class 260 of the concretization application 250a explained with reference to FIG. 19. In FIG. 20, an instruction given to the data perpetuation function object 381 to perpetuate the operation mode information can be issued by the operation mode object 360 of the concretization application 250a. It should be noted that each object in the sequence chart of FIG. 20 is an instance of a class given the same name in FIG. 19. In FIG. 20, a description will be given of a part encircled by the dotted lines in FIG. 12.

In step S601, the mode program function UI 321 requests the mode program function object 320 to register the mode program by using the program name input by an operator in the mode program registration screen 730 as an argument. Proceeding to step S601, an instruction to acquire the operation mode information (syntax object) with respect to one of the setting items is output from the mode program function object 320 to the operation mode object 330.

Proceeding to step S602, an instruction to acquire the operation mode information with respect to one of the setting items is output from the operation mode object 330 to the operation mode object 360a. Proceeding to step S603, it is determined whether the operation mode object 360a carries out perpetuation by itself. Here, it is supposed that the perpetuation is carried out by the operation mode object 360a.

Proceeding to step S605 subsequent to S604, an instruction to perpetuate the operation mode information is output from the operation mode object 360a to the data perpetuation function object 381. Based on the instruction, the data perpetuation function object 381 perpetuates the operation mode information (syntax object) and the operation mode ID, which is identification information of the operation mode information (refer to FIG. 14).

Proceeding to step S606 after S605, the operation mode ID, which is the identification information of the operation mode information, is output from the data perpetuation function object 381 to the operation mode object 360a. Proceeding to step S607, a notification that the operation mode information has already been perpetuated is sent from the operation mode object 360a to the operation mode object 330. It should be noted that the notification contains the operation mode ID. Additionally, the notification may be substituted by an output of the operation mode ID.

Proceeding to step S607, a notification that the operation mode information has already been perpetuated is sent from the operation mode object 330 to the mode program functional object 381. According to the notification input in step S608, the mode program function object 381 does not output the instruction of a perpetuating process at a location given the sign (b).

Step S20, which is the process of step S602 to step S608, is a sequence when the perpetuating process is performed on the concretization application side. On the other hand, step S21 is a process when the mode program function object 320 outputs the instruction of perpetuation, and is almost the same as the process from step S404 to step S409 in FIG. 12.

The point different from FIG. 12 is that step S611, which is a step of determining whether the operation mode object 360a performs the perpetuating process by itself, is contained. The step S611 is performed after step S610 where the operation mode object 360a receives the instruction to acquire the operation mode and further after the operation mode object 360a creates the operation mode information. It should be noted that step S610 corresponds to step S405 of FIG. 12.

Because other steps in step S21 of FIG. 20 are the same process as the process of steps S404 to S409 of FIG. 12, descriptions thereof will be omitted. Similarly, the process of steps S616 to S618 is the same as the process of steps S410 to S412 of FIG. 12, and descriptions thereof will be omitted.

It should be noted that a main body that sends the instruction of perpetuation of the operation mode information of each setting item may be determined based on whether the setting item concerned is peculiar in the concretization application 250a or common to each application. With respect to the former, the concretization application 250 side sends the instruction of perpetuation. With respect to the later, the application framework 210 side may send the instruction of perpetuation.

Moreover, the procedure and form of the perpetuation by the concretization application 250a may be defined freely for each concretization application 250a. In this case, the operation mode object 360a of the concretization application 250a may give the perpetuation ID to a set of operation mode information which has been perpetuated according to a form defined freely, and the notification of the perpetuation ID may be sent to the application framework 210 in step S607. The mode program function 320 of the application framework 210 may perpetuate the perpetuation ID together with the operation ID with respect to the operation mode information perpetuated in the application framework 210 according to the forms of FIG. 14 and FIG. 15.

As a case where the perpetuation by the concretization application 250a is necessary, there are considered a case where the setting item is perpetuated according to a data type defined peculiar to in the concretization application 250a and a case where it is inappropriate to perpetuate the setting item as it is.

Here, as an example of the setting item of which value is inappropriate to be perpetuated as it is, there is a selected tray (a tray selected as a paper supply tray). For example, when an operator select a tray 1 in which A4LEF is set as a setting item of a print job, the content that "the selected tray=tray 1" with respect to the setting item concerned is perpetuated as the operation mode information. However, when developing (restoring) the perpetuated operation mode information, if the paper size set in the tray 1 is A3, the result of execution of the mode program using the operation mode information concerned is different from what the operator intended.

Thus, in order to avoid such a problem, with respect to the selected tray, the tray number is not used and the paper size set to the selected tray when the perpetuation is carried out is set to a value to be perpetuated. In the above-mentioned example, the content that "selected tray=A4LEF" is perpetuated as the operation mode information. At the time of restoration, the tray number of the paper supply tray in which the paper of size A4LEF is set is set to the selected tray. It is difficult for the application framework 210 to perform such a determination with respect to the setting item peculiar to the concretization application 250a. Thus, such a determination must be performed on the concretization application 250a side.

It should be noted that the developing process of the mode program corresponding to FIG. 20 may be the same as that shown in FIG. 17. However, it is necessary to override the method call out in step S507 of FIG. 17 in the operation mode class 260a. In such a case, a process corresponding to the perpetuation form peculiar to the concretization application 250a may be mounted in the overridden method.

Second Embodiment

Figure 21:
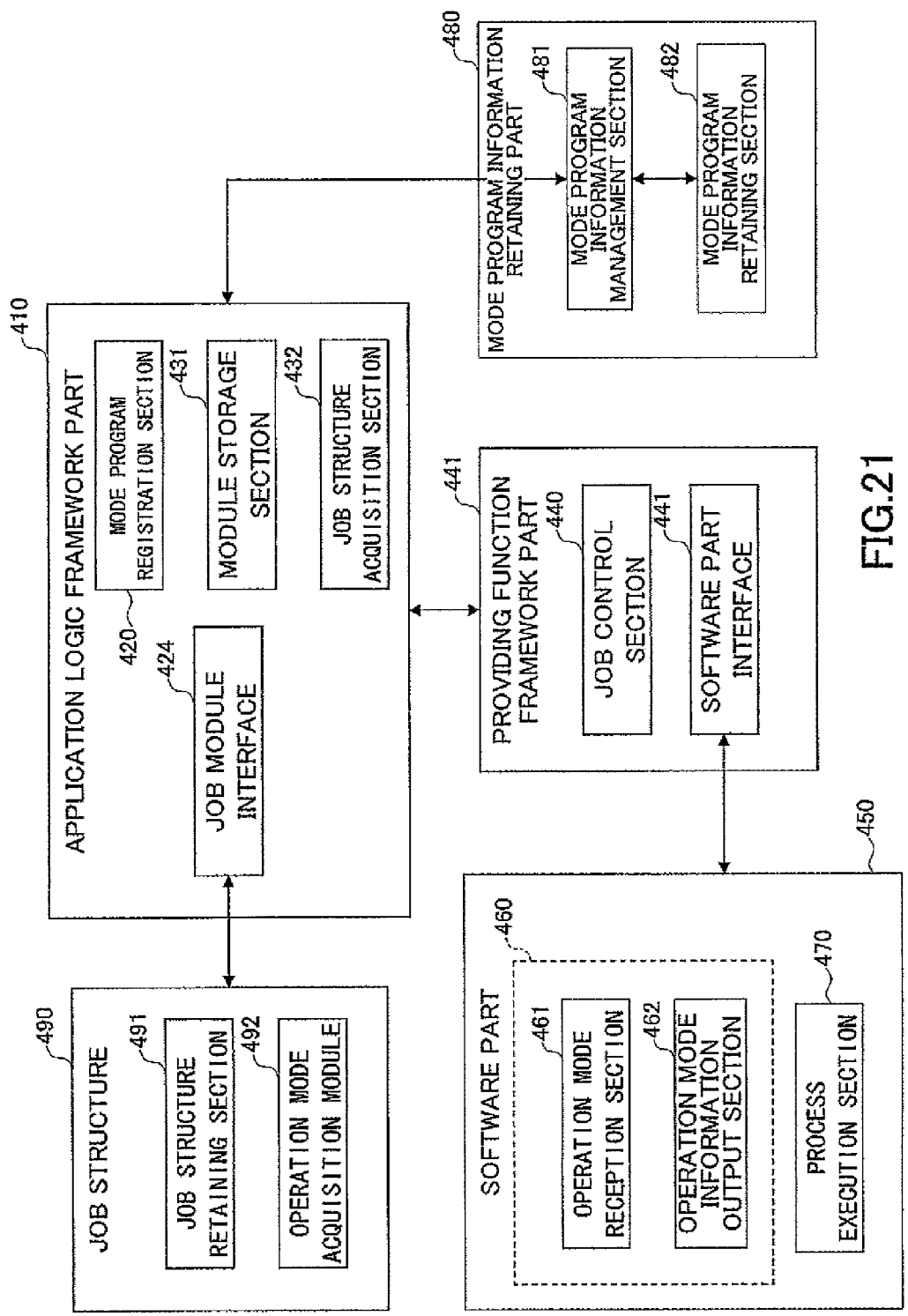
FIG. 21 is a block diagram of an image forming apparatus according to a second embodiment of the present invention.

FIG. 21 is a structure diagram of an image forming apparatus according to a second embodiment of the present invention. The image forming apparatus 400 shown in FIG. 21 includes an application logic framework part 410, a providing function framework part 411, a software part 450, a mode program information retaining part 480 and a job structure part 490. The structures of the software part 450 and the mode program information retaining part 480 are the same as the software part 150 and the mode program information retaining part 180 shown in FIG. 1, and descriptions thereof will be omitted.

The point that the image forming apparatus 400 of FIG. 21 differs from the image forming apparatus 100 of FIG. 1 is that the software part is assembled in the application framework in FIG. 1 while the framework is divided into the application logic framework part 410 corresponding to the framework of the job module and the providing function framework part 411 corresponding to the software part in FIG. 21. Thereby, a combination of software parts can be defined and executed for each application, which is a kind of job.

The application logic framework part 410 includes a mode program registration section 420, a job module interface 424, a module storage section 431 and a job structure acquisition section 432. The function and structure of the mode program registration section 420 are the same as that of the mode program registration section 120 of FIG. 1, and descriptions thereof will be omitted.

The job module interface 424 is an interface to which the job structure part 490 (job module), which corresponds to each kind of job, is connected.

The module storing section 431 is a section to store the operation mode acquisition module 492 contained in the job structure part 490 mentioned later. A function the same as the operation mode acquisition section 130 shown in FIG. 1 can be achieved by the module storage section 431 storing the operation mode acquisition module 492.

The job structure acquisition section 432 acquires a list of software parts, which constitute the job, from the job structure part 490 corresponding to the kind of the job through the job module interface 424 for each kind of job input by an operator.

The providing functional framework part 411 includes a job control section 440 and a software part interface 441. The job control section 440 controls software part 450 according to an instruction to execute the job. The job control section 440 controls software part 450 through the software part interface 441 according to the corresponding mode program information when an execution of the job is instructed by the mode program. The software part interface 441 is an interface to which a corresponding software part for each process constituting the job is connected.

The job structure part 490 includes a job structure retaining section 491 and an operation mode acquisition module 492. The job structure retaining section 491 retains a list of software parts corresponding to the processes, which constitute the job, and information regarding an order of execution of the software parts for each kind of job to which the job structure part 490 corresponds.

The operation mode acquisition module 492 performs the same function as the operation mode acquisition section 130 of FIG. 1 by being stored in the module storage section 431. By the operation mode acquisition module 492 being stored in the module storage section 431, an instruction of acquisition of an operation mode is sent to the software parts and operation mode information and the identification information of the operation mode information are acquired. The function of the operation mode acquisition section realized by the operation mode acquisition module 429 instructs the mode program information retaining part 480 to perpetuate the operation mode information.

(Structure of Software Realizing a Mode Program Function According to the Second Embodiment)

Figure 22:
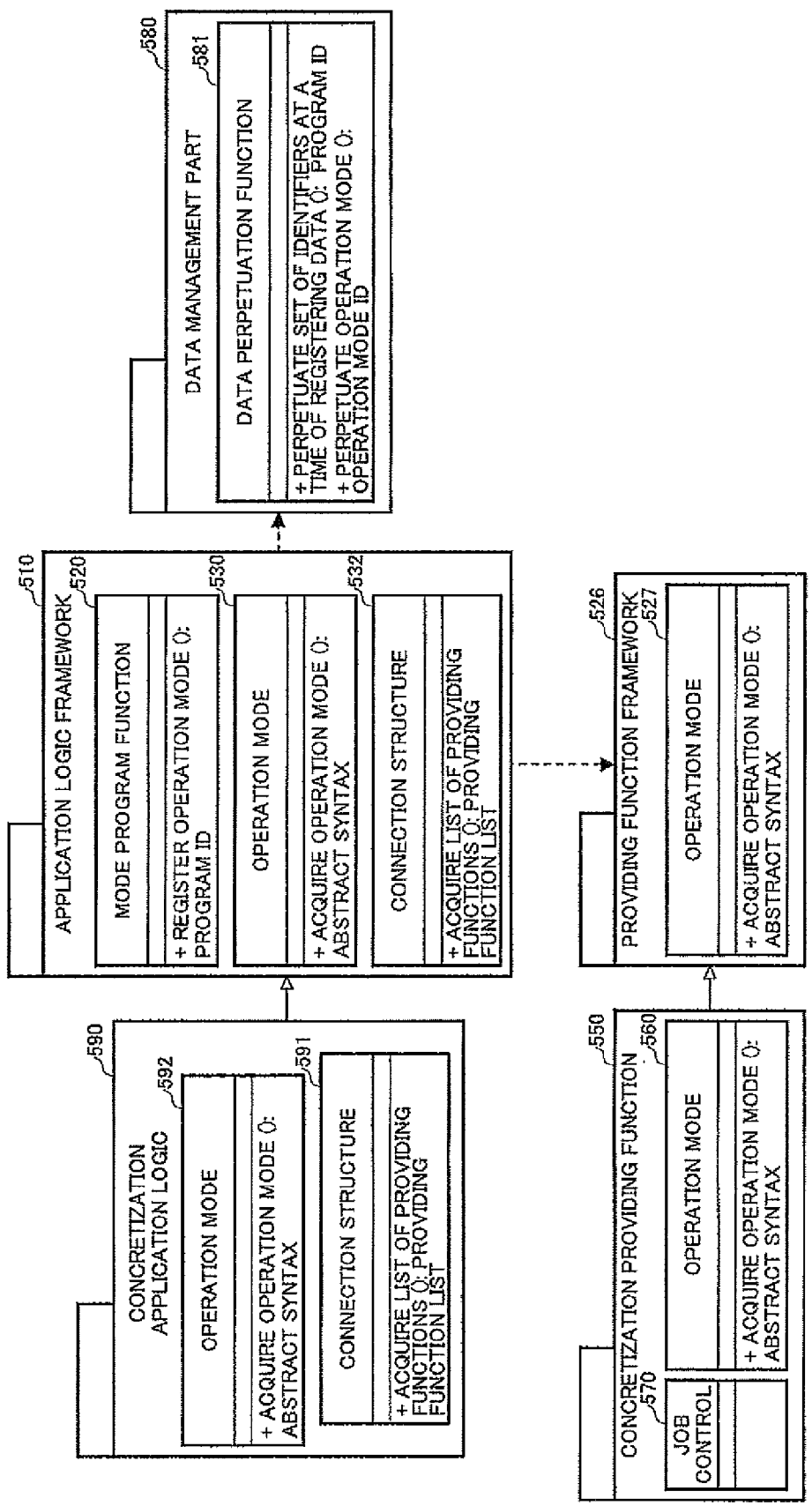
FIG. 22 is a diagram of a software structure for achieving a mode program function.

FIG. 22 is a block diagram of a structure of software, which performs a mode program function according to the second embodiment of the present invention. The software shown in FIG. 22 includes an application logic framework 510, a providing function framework 526, a concretization application logic 590 and a concretization providing function 550.

In FIG. 22, a different point from FIG. 2 is that the framework part shown in FIG. 22 is divided into the application logic framework 510 and the providing function framework 526, while the framework part shown in FIG. 2 includes only the application framework 210. Thereby, the application logic part, which has a different structure for each kind of job, can be realized as a concretization application logic corresponding to each kind of job.

It should be noted that the data management part 580 shown in FIG. 22 has the same function and structure as the data management part 280 shown in FIG. 2, and descriptions thereof will be omitted.

The application logic framework 510 shown in FIG. 22 includes a mode program function class 520, an operation-mode class 530 and a connection structure class 532. The application logic framework 510 corresponds to the application logic framework part 410 of FIG. 21.

The mode program function class 520 performs an operation of registering an operation mode, and outputs a program ID, which is identification information of the mode program, as a return value. The operation mode class 530 performs an operation to acquire the operation mode, and outputs operation mode information by an abstract syntax as a return value. The connection structure class 532 performs an operation to acquire a list of providing functions, which are processes constituting a job, and outputs a providing function list, which is a return value.

The concretization application logic 590 corresponds to the job structure part 490 of FIG. 21. The concretization application logic 590 inherits the application logic framework 510, and includes a connection structure class 591 and an operation mode class 592. The connection structure class 591 performs an operation to acquire a list of providing functions corresponding to each application which is a kind of job. The providing functions are performed by software parts. Thus, the connection structure class 591 may acquire a list of software parts and an order of execution thereof. The connection structure class 591 inherits the connection structure class 532.

The operation mode class 592 performs an operation to acquire the operation mode, and outputs the operation mode information described by an abstract syntax, which is a return value, and the identification information of the operation mode. The operation mode class 592 performs these operations by being incorporated into the application framework 510.

The offer function framework 526 corresponds to the offer function framework part 411 of FIG. 21, and has an operation mode class 527. The operation mode class 527 inherits the operation mode class, and is inherited by a concretization providing function 550 mentioned later. Thereby, for each concretization application logic 590 corresponding to a kind of job, the operation mode class 592 is incorporated into the application logic framework 510, and is inherited by the concretization providing function 550 from the providing function framework 526.

The concretization providing function 550 corresponds to the software part 450 of FIG. 21, and performs a part of the processes which constitute a job. The concretization providing function 550 includes an operation mode class 560 and a process control class 570. The operation mode class 560 inherits the operation mode class 526, and performs an operation to acquire the operation mode and outputs the operation mode information described by an abstract syntax. The process control class 570 performs an execution control of a part of processes which constitute a job.

(Example of the Concretization Application Logic and the Concretization Providing Function (Part 1))

Figure 23:
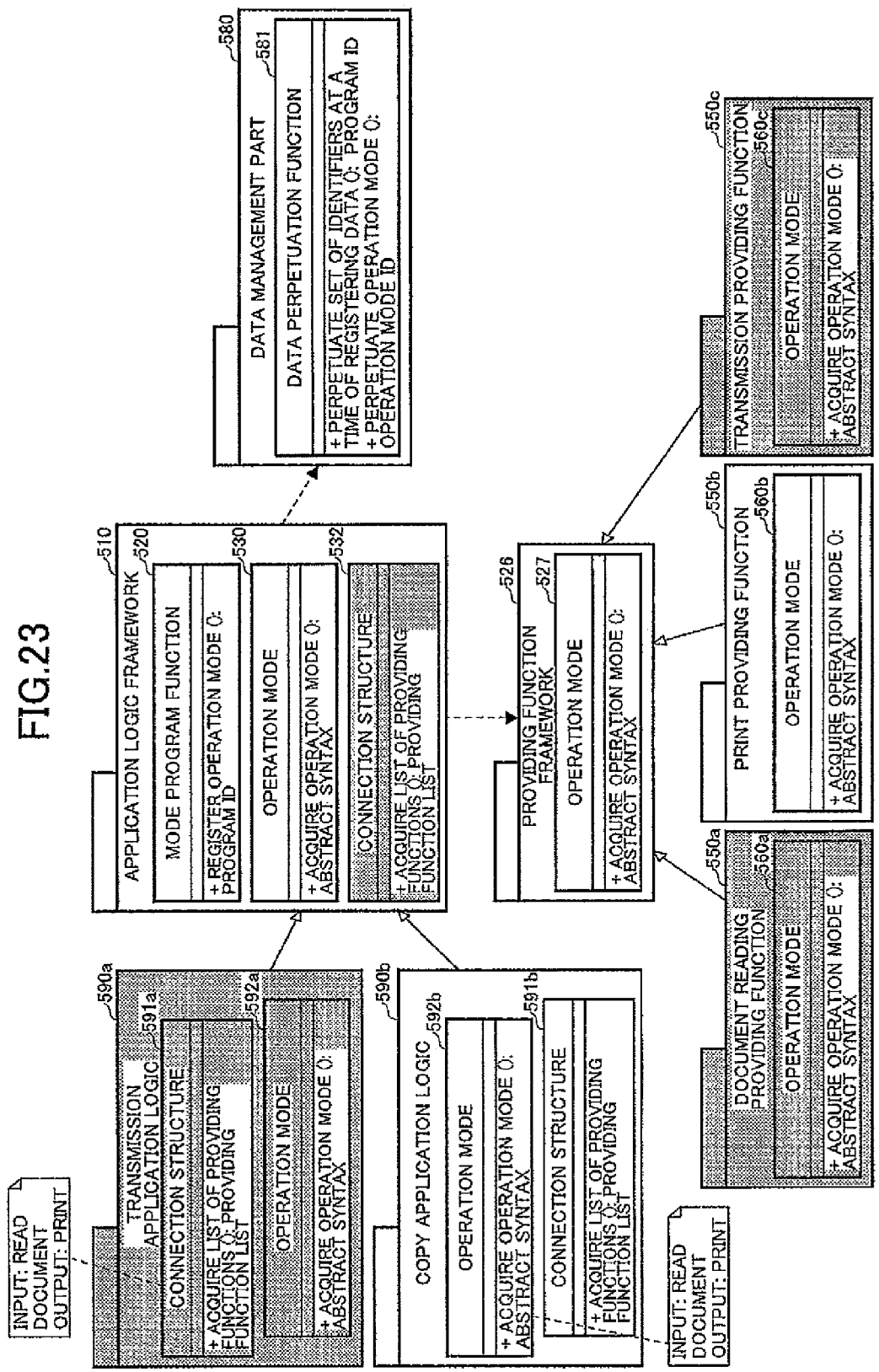
FIG. 23 is an illustration for explaining a specific example of a concretization application and a concretization providing function.
Figure 24:
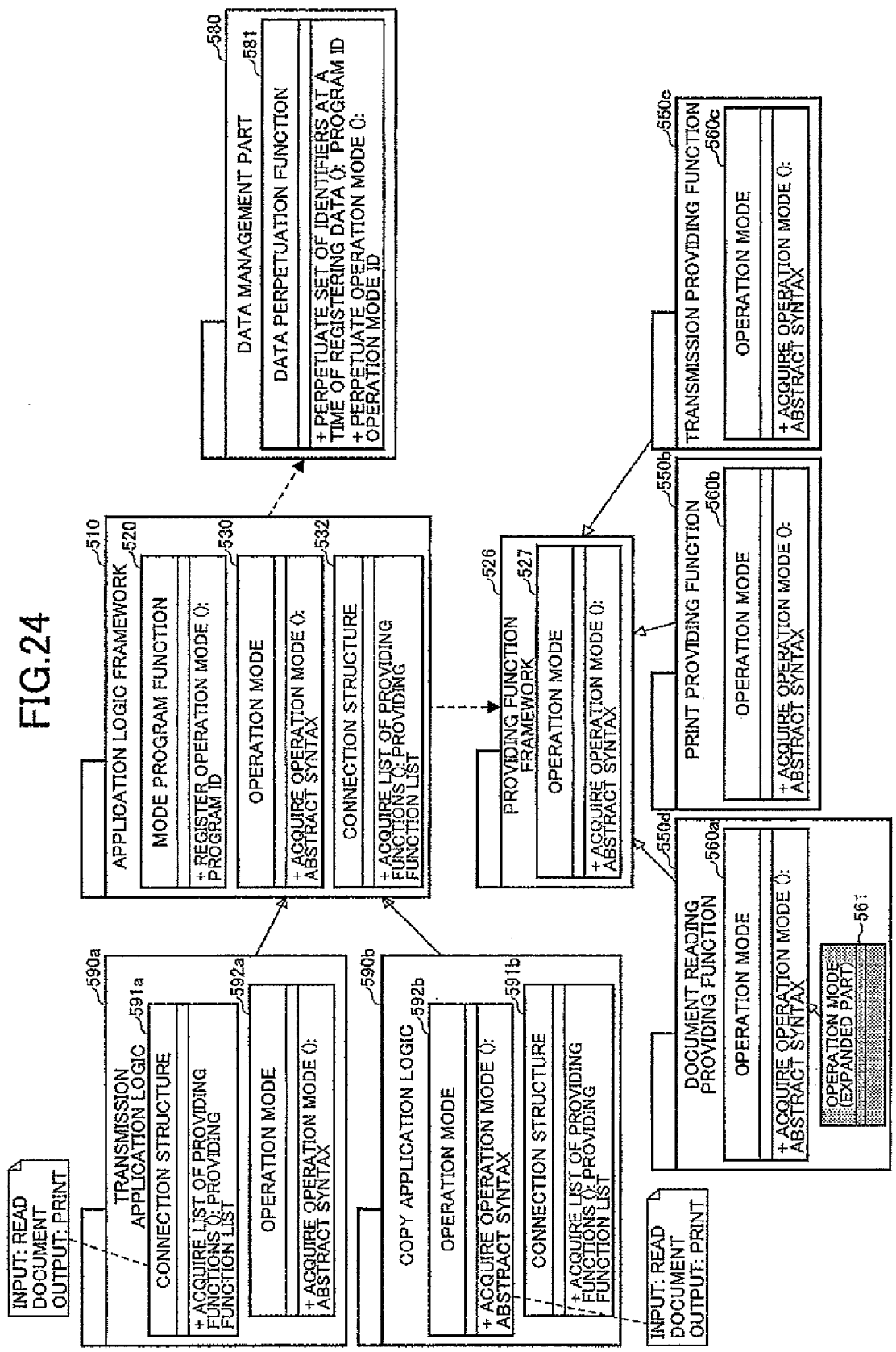
FIG. 24 is an illustration for explaining a specific example of a concretization application and a concretization providing function.

FIG. 23 and FIG. 24 are illustrations for explaining specific examples of the concretization application logic and the concretization providing function. In FIG. 23 and FIG. 24, the application logic 510, the providing function framework 526 and the data management part 580 have the same functions and structures as that shown in FIG. 22, and descriptions thereof will be omitted.

In FIG. 23, a transmission application logic 590a and a copy application logic 590b are shown as examples of the concretization application logic 590. Additionally, a document reading providing function 550a, a print providing function 550b and a transmission providing function 550c are shown as examples of the concretization providing function 550.

The transmission application logic 590a includes a connection structure class 591a and an operation mode class 592a. The connection structure class 591a retains information indicating that the "transmission" application takes an input as a "document reading" process and an output as a "transmission" process, and performs an operation to output the information. The operation mode class 591a performs an operation to set an operation mode for each providing function which performs a process constituting the transmission application.

The copy application logic 590b includes a connection structure class 591b and an operation mode class 592b similar to the transmission application logic 590a. The connection structure class 591b retains information indicating that the "copy" application takes an input as a "document reading" process and an output as a "print" process, and performs an operation to output the information. The operation mode class 591b performs an operation to set an operation mode for each providing function which performs a process constituting the copy application.

The document reading providing function 550a includes an operation mode class 560a, the print providing function 550b includes an operation mode class 560b, and the transmission providing function 550c includes an operation mode class 560c. The operation mode class provided to each providing function performs setting of the operation mode for each providing function, and outputs the operation mode information described by an abstract syntax. It should be noted that a process control class (not shown in the figure) corresponding to each process is further provided to those providing functions.

In FIG. 23, the transmission job is achieved by the transmission application logic 590a, the document reading providing function 550a and the transmission providing function 550c being incorporated into the framework and inheriting the corresponding classes.

On the other hand, in FIG. 24, the document reading providing function 550d includes an expanded operation mode class 561 in addition to the operation mode class 560a provided in the document reading providing function 550a. Other software parts shown in FIG. 24 have the same functions and structures as that shown in FIG. 23, and descriptions thereof will be omitted.

It can be appreciated from FIG. 23 that even if a class contained in one of the providing functions, there is no need to change the application logic. Thus, the development of an image forming apparatus can be carried out efficiently, and a development cost can be reduced and a development period can also be reduced.

(Example of a Process of Displaying a Setting Screen of a Copy Application)

Figure 25:
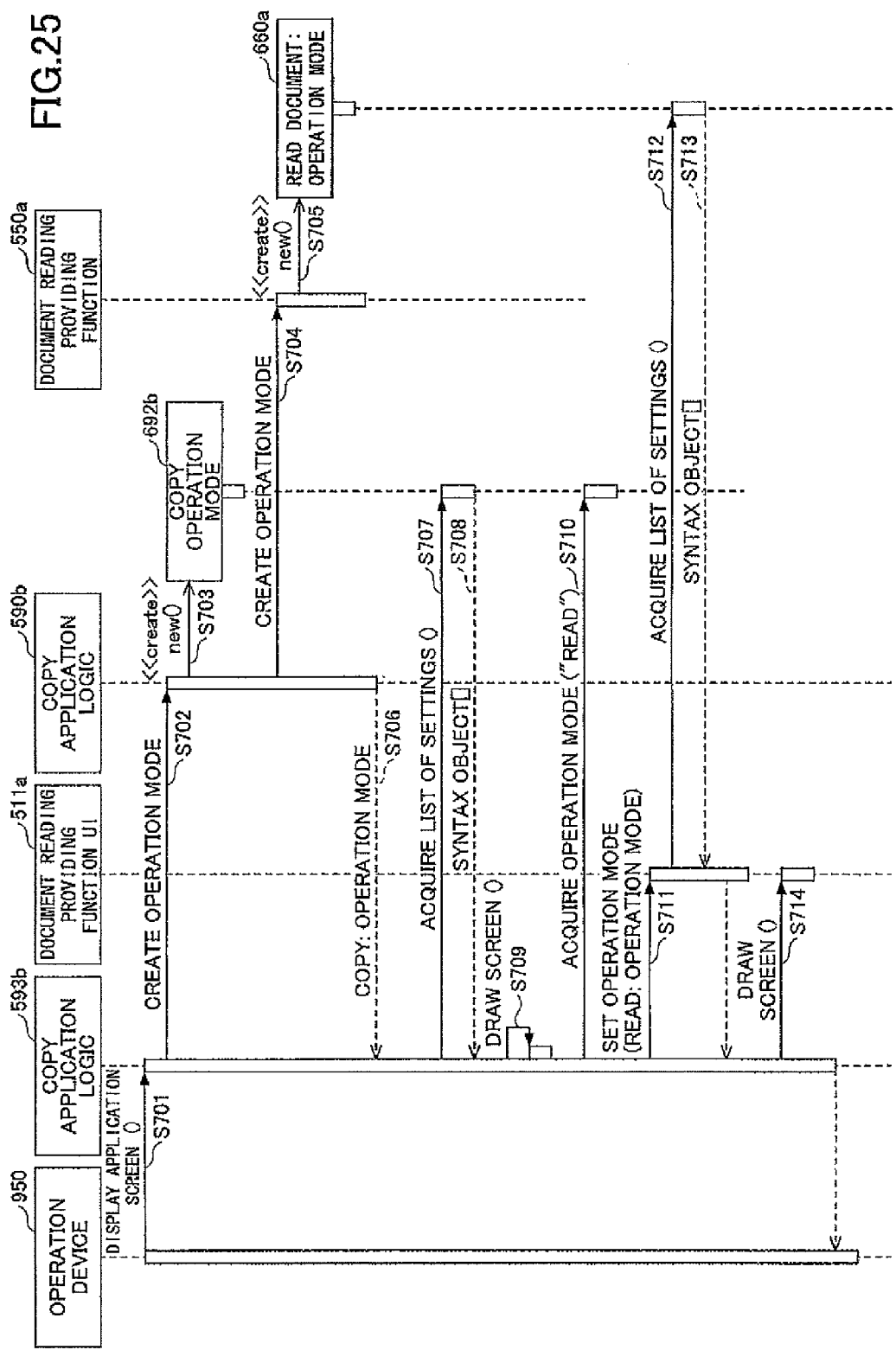
FIG. 25 is a sequence chart of a process for displaying a setting screen of a copy application according to the second embodiment.

FIG. 25 is a sequence chart of a process of displaying a setting screen of a copy application according to the second embodiment of the present invention. In FIG. 25, a copy application logic UI 593b is a part which performs an input-and-output control to the operation device 950 in the copy application logic 590b. Additionally, a document reading providing function UI 551a is a part which performs an input-and-output control to the operation device 950 in the document reading providing function 550a. It should be noted that each object in the sequence chart of FIG. 25 is an instance of a class of the same name in FIG. 23.

In step S701, the copy button 711 in the application list screen 710 is pressed by an operator, and the copy application logic UI 593b corresponding to the copy button 711 is called. Subsequent to step S701, the process proceeds to step S702 where the copy application logic UI 593b requests the copy application logic 590b to create the operation mode object 692b. Then, in step 3703, the copy application logic 590b creates the operation mode object 692b. Subsequent to step S703, the process proceeds to step S704 where the copy application logic 590b requests the document reading providing function 550a to create the operation mode object 660a. Then, in step S704, the document reading providing function S50a creates the operation mode object 660a, and outputs the created operation mode object 660a to the copy application logic 590b. In step S706, the copy application logic 590b relates the operation mode object 660a to the operation mode object 692b, and outputs the operation mode object 692b to the copy application logic UI 593b.

Subsequent to step S706, the process proceeds to steps S708 and S709, where the copy application logic UI 593b acquires a list of setting items (list of syntax objects) from the output operation mode object 692b. The list of syntax object acquired here is an arrangement of abstract syntax classes, and each syntax object is changed into an instance by a class corresponding to each type of attribute (refer to FIG. 3). Subsequent to step S708, the process proceeds to step S709 where the copy application logic UI 593b draws a part of the setting screen on the operation device 950 in accordance with the acquired syntax object. Here, the part of the setting screen refers to a part relating to the setting items with respect to the copy application logic 590b from among all the setting items set up in the copy job.

Subsequent to step S709, the process proceeds to step S710 where the copy application logic UI 593 acquires the operation mode object 560a, which is related to the operation mode object 692b. Then, in step S711, the copy application logic UI 593 sets the acquired operation mode object 560a to the document reading providing function UI 551a.

Subsequent to step S711, the process proceeds to steps S712 and S713 where the document reading providing function UI 551a acquires a list of setting items (list of syntax objects) from the set operation mode object 560a. Then, the process proceeds to step S714 where the copy application logic UI 593 requests the document reading providing function UI 551a to draw the setting screen. In response to the request, the document reading providing UI 551a draws a part corresponding to the setting item with respect to the reading providing function 550a in accordance with the syntax objects which the document reading providing UI 551a acquired.

It should be noted that, in FIG. 25, the process performed with respect to the document reading providing function 550a is performed also to the print providing function 550b. Accordingly, a portion relating to the setting items with respect to the print providing function 550b is drawn in the setting screen. As a result, the setting screen is displayed as shown in FIG. 8. In the setting screen 720 shown in FIG. 8, the read setting area 722 is a part relating to the setting item with respect to the reading providing function 550a, and the print setting area 723 is a part relating to the setting item with respect to the print providing function 550b.

(Example of a Process of Setting Operation Mode Information)

Figure 26:
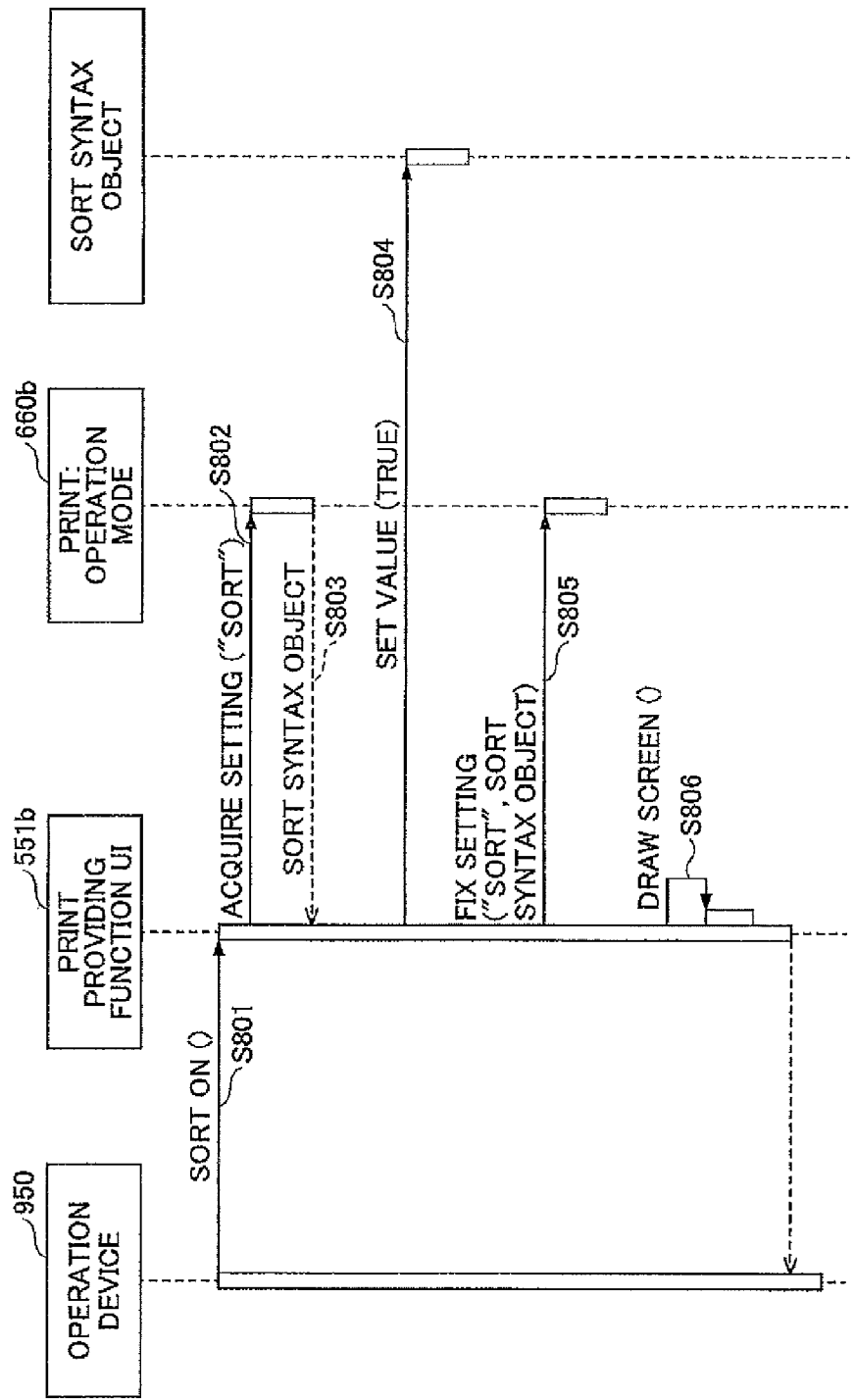
FIG. 26 is a sequence chart of a process for setting operation mode information according to the second embodiment.

FIG. 26 is a sequence chart of a process of setting operation mode information. Referring to FIG. 26, a description will be given of an example in which a setting as to whether sorting is needed or not (ON/OFF) is performed with respect to the copy application.

In step S801, the sort button 721 in the setting screen 720 is pressed by an operator, and a notification that the sorting is set to ON is sent to the print providing function UI 551b. Then, in step S802, the print providing function UI 551b requests the operation mode object 660b of the print providing function 550b to acquire a syntax object (sort syntax object) corresponding to the setting item of sorting by using "sort" as a key. Subsequent to step S802, the process proceeds to step S803 where the operation mode object 660b searches for a syntax object of which attribute name is "sort", and outputs the syntax object concerned (sort syntax object) to the print providing function UI 551b. It should be noted that the sort syntax object is an instance of the truth value type syntax class, but the sort syntax object is output as an abstract syntax class in this example.

Subsequent to step S803, the process proceeds to step S804 where the print providing function UI 551b casts the output sort syntax object to the truth value type syntax class in accordance with the type of the attribute thereof, and sets a setting value (here, "true") to the cast sort syntax object. Then, in step S805, the print providing function UI 551b sets the sort syntax object, to which the setting value (true) was set, to the operation mode object 660b. Thereby, the sort syntax object is updated in the operation mode object 660b. Thereafter, in step S806, the print providing function UI 551b updates the display state of the setting screen 720 as shown in FIG. 10.

(Example of a Process of Registering a Mode Program in a Copy Job)

Figure 27:
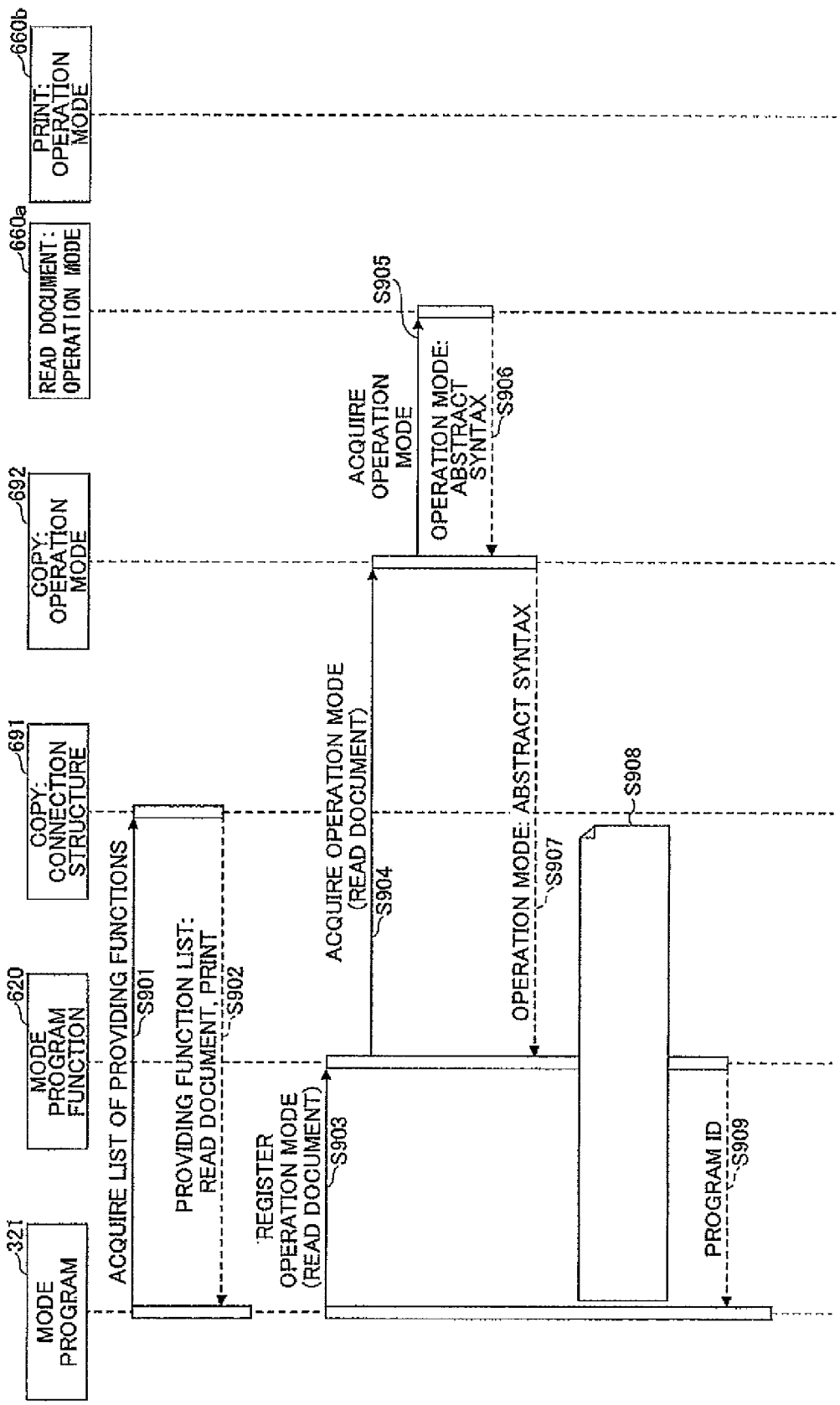
FIG. 27 is a sequence chart of a process for registering a mode program in a copy job mode.

FIG. 27 is a sequence chart of a process of registering a mode program in a copy job. Referring to FIG. 27, a description will be given of a part encircled by dashed lines in FIG. 12.

It step S901, the node program function UI 321 requests the connection structure object 691 of the copy application logic to acquire a list of providing functions for achieving the copy job input by an operator. Then, in step S902, the connection structure object 691 outputs to the display section (not shown in the figure) the list of providing functions of the copy job and information regarding an order of execution of the functions. Accordingly, the list of providing functions is displayed on the display section.

Subsequent to step S902, the process proceeds to step S903 where the input section (not shown in the figure) requests the mode program function object 620 to register the operation mode for each providing function input by the operator. Here, registration of the operation mode is requested to the document reading process from among processes contained in the copy job. Subsequent to step S903, the process proceeds to step S904 where the mode program function object 620 requests the operation mode object 631 contained in the copy application logic to acquire the operation mode information. Then, in step S905, the operation mode object 631 requests the operation mode object 660a contained in the copy providing function to acquire the operation mode. In response to the request, the operation mode object 660a creates operation mode information expressed by an abstract syntax.

Subsequent to step S905, the process proceeds to step S906 where the operation-mode object 660a outputs the operation mode information expressed by an abstract syntax to the operation mode object 631. Then, in step S907, the operation mode object 631 outputs the operation mode information to the mode program function object 620. The process of step S908 subsequent to step S907 is the same as the process of steps S410 and S411 of FIG. 1, and a description thereof will be omitted. Subsequent to step S908, the process proceeds to step S909 where the mode program function object 602 outputs the program ID to the mode program function UI 321.

It should be noted that although the operation mode object 660a does not perform a perpetuation process in the example of FIG. 27, the present embodiment is not limited to such a process. That is, as explained with reference to FIG. 20, the operation mode object 660a may perform the perpetuation process.

(Computer Structure)

Figure 28:
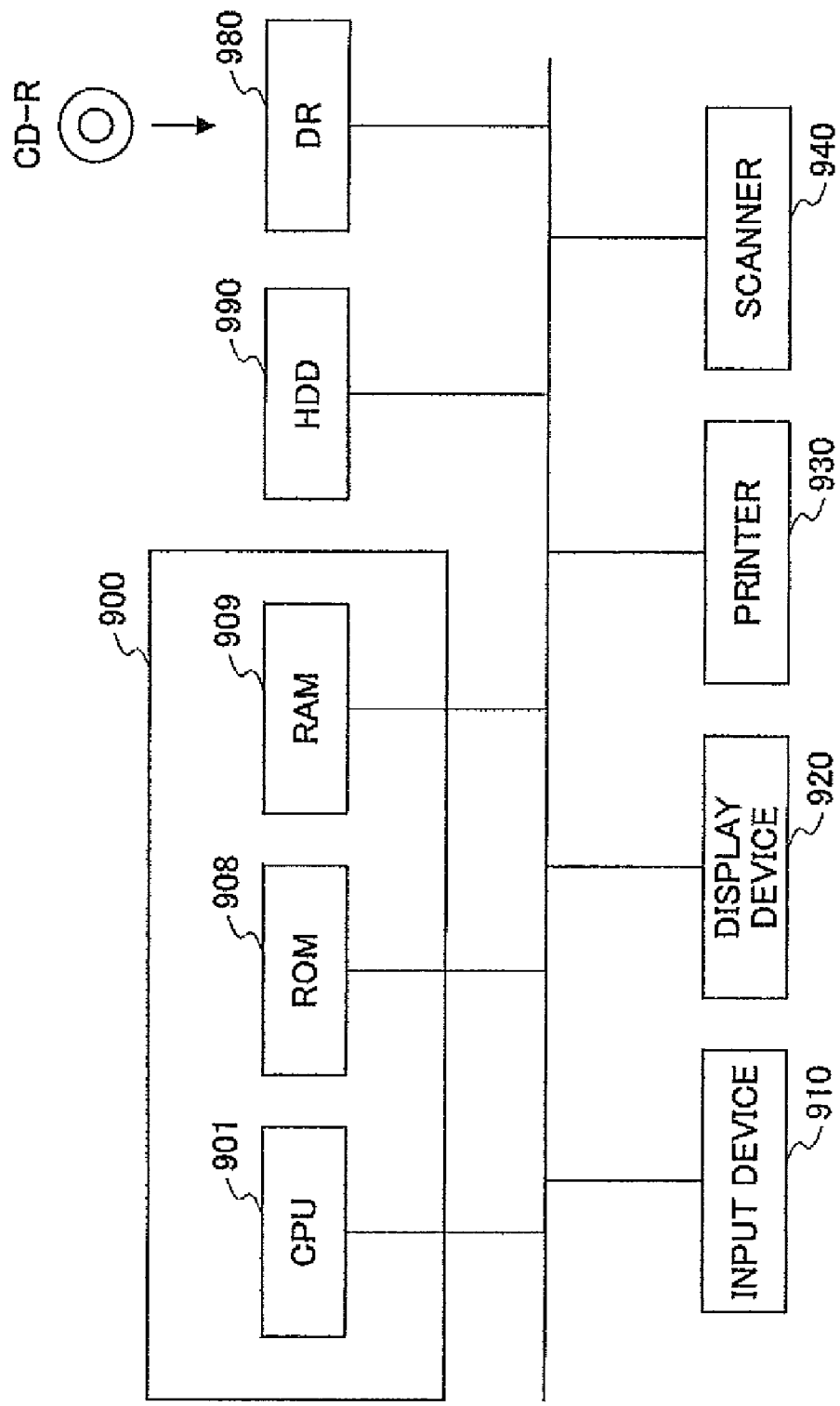
FIG. 28 is a block diagram of a hardware structure of a computer realizing an image forming apparatus according to the present invention.

FIG. 28 is a block diagram of a computer, which realizes the image forming apparatus according to the above-mentioned embodiments of the present invention. The computer shown in FIG. 28 includes a main processing part 900, an input device 910, a display device 920, a printer 930, a scanner 940, a disc reader (DR) 980 and a hard disk drive (HDD) 990. The main processing part 900 is a main part for achieving a computer function, and includes a CPU 901, a ROM 908 and a RAM 909. The CPU 901 reads a computer program from the ROM 908, and develops the computer program on the RAM 909 in order to execute the computer program according to the above-mentioned embodiments. The ROM 908 is a non-volatile memory, which stores computer programs executed by the CPU 901 and parameters necessary for controlling the image forming apparatus. The RAM 909 is a work memory used when the CPU 901 performs a process.

The input device 910 is, for example, a keyboard which is used by an operator to input an instruction. The display device 920 displays various data and conditions of the computer. The printer 930 forms and outputs an image on a medium. The scanner 940 optically reads an image on a medium. The disk reader reads information (programs) recorded on a medium such as a CD-R. The HDD 990 stores a large amount of data such as image data.

The computer programs concerning the above-mentioned embodiments of the present invention are stored in the HDD 990 or the ROM 908, and may be stored in a computer readable recording medium such as a CD-R, which is read by the disk reader DR 980.

The present invention is not limited to the specifically disclosed embodiments, and variations and modifications may be made without departing from the scope of the present invention.

The present application is based on Japanese priority applications No. 2007-218595 filed Aug. 24, 2007 and No. 2008-200036 filed Aug. 1, 2008, the entire contents of which are hereby incorporated herein by reference.

What is claimed is:

1. An image forming apparatus comprising:
a control program commonly used by a plurality of applications respectively corresponding to a plurality of processes that constitute a job performed by the image forming apparatus;
a mode program registration section configured to output an instruction to acquire the operation mode information set to the job and configured to acquire the operation mode information that is defined in an abstract form so that the control program is permitted to handle the operation mode information, wherein the mode program registration section confines a mode program function of a concretization application within an application framework, as a process common to the applications, in a manner such that the operation mode information defined in an abstract form is stored and retrieved;
an operation mode acquisition section configured to send a request to a software part corresponding to said job to acquire said operation mode information, configured to acquire the operation mode information of a predetermined type, which is a return value output from the software part, and configured to output to said mode program registration section; and
a mode program information management section configured to create mode program information including the operation mode information acquired by said mode program registration section and identification information of said mode program, and configured to store the mode program information in a mode program information retaining section,
wherein the operation mode acquisition section and the mode program information management section are contained in the control program.

2. The image forming apparatus as claimed in claim 1, further comprising a job control section that controls said job by causing said software part to be executed based on said operation mode information contained in said mode program information corresponding to the identification information of said mode program in response to an instruction to execute said job according to the identification information of said mode program.

3. The image forming apparatus as claimed in claim 1, wherein said operation mode information includes identification information of said software part, identification information of a setting item set in the software part, and information indicating a data type of said setting item.

4. The image forming apparatus as claimed in claim 1, wherein said job is constituted by a process carried out by a plurality of software parts, and the mode program information contains information relating to the operation mode information set to one of said software parts.

5. The image forming apparatus as claimed in claim 1, further comprising:
a job module interface connecting a job module corresponding to each kind of job; and
a job structure acquisition section that acquires from said job module a list of software parts corresponding to processes constituting said job and an execution order of said software parts,
wherein said operation mode acquisition section requests acquisition of said operation mode to said software part contained in the list of software parts acquired by said job structure acquisition section.

6. The image forming apparatus as claimed in claim 5, further comprising:
an application framework that includes said mode program registration section, a module storage section storing said operation mode acquisition section, and said job module interface; and
a providing function framework that includes a software part interface for connecting said software parts,
wherein said job module includes an operation mode acquisition module, which changes into said operation mode acquisition section by being stored in said module storage section in accordance with each kind of job.

7. The image forming apparatus as claimed in claim 5, wherein said job module includes a job structure retaining section that retains the list of software parts corresponding to each kind of said job and the execution order of said software parts.

8. The image forming apparatus as claimed in claim 1, wherein said software part includes:
an operation mode reception section that receives a request to acquire the operation mode information from said operation mode acquisition section;
an operation mode output section that outputs to said operation mode acquisition section the operation mode information of the predetermined type based on a request of acquisition of the operation mode information received by said operation mode reception section; and
a process execution section that executes a part of the processes constituting said job in accordance with said operation mode information from said job control section.

9. The image forming apparatus as claimed in claim 1, wherein said mode program information retaining section is a non-volatile memory.

10. An image forming method implemented by a control program commonly used by a plurality of applications respectively corresponding to a plurality of processes that constitute a job performed by the image forming method that registers a mode program constituted by operation mode information set to a job in order to execute the job by retrieving the mode program, the image forming method comprising:
a mode program registration start step of outputting an instruction to acquire the operation mode information set to said job, the operation mode information being defined in an abstract form so that the control program is permitted to handle the operation mode information, wherein a mode program function of a concretization application is confined within an application framework, as a process common to the applications, in a manner such that the operation mode information defined in an abstract form is stored and retrieved;
an operation mode acquisition step of sending a request to a software part corresponding to a process constituting said job to acquire said operation mode information in accordance with the instruction of said mode program registration start step;
an operation mode response step of acquiring the operation mode information of a predetermined type, which is a return value output from the software part;
a mode program information creating step of creating mode program information including the operation mode information acquired by said mode program registration step and identification information of said mode program; and
a mode program information management step of storing the mode program information in a mode program information retaining section.

11. The image forming method as claimed in claim 10, further comprising a job control step of controlling said job by causing said software part to be executed based on said operation mode information contained in said mode program information corresponding to the identification information of said mode program in response to an instruction to execute said job according to the identification information of said mode program.

12. The image forming method as claimed in claim 10, wherein said operation mode information includes identification information of said software part, identification information of a setting item set in the software part, and information indicating a data type of said setting item.

13. The image forming method as claimed in claim 10, wherein said job is constituted by a process carried out by a plurality of software parts, and the mode program information contains information relating to the operation mode information set to one of said software parts.

14. The image forming method as claimed in claim 10, further comprising:
a job structure acquisition step of acquiring from a job module a list of software parts corresponding to processes constituting said job and an execution order of said software parts,
wherein said operation mode acquisition step requests acquisition of said operation mode to said software part contained in the list of software parts acquired by said job structure acquisition step.

15. The image forming method as claimed in claim 10, wherein said software part includes:
an operation mode reception step of receiving a request to acquire the operation mode information from said operation mode acquisition section;
an operation mode information output step of outputting the operation mode information of the predetermined type based on a request of acquisition of the operation mode information received by said operation mode reception step; and
a process execution step of executing a part of the processes constituting said job in accordance with said operation mode information output by said job control step.

16. A non-transitory computer readable information recording medium storing a computer program for causing a computer to perform an image forming method implemented by a control program commonly used by a plurality of applications respectively corresponding to a plurality of processes that constitute a job performed by the image forming method that registers a mode program constituted by operation mode information set to a job in order to execute the job by retrieving the mode program, the image forming method comprising:

a mode program registration start step of outputting an instruction to acquire the operation mode information set to said job, the operation mode information being defined in an abstract form so that a control program is permitted to handle the operation mode information, wherein a mode program function of a concretization application is confined within an application framework, as a process common to the applications, in a manner such that the operation mode information defined in an abstract form is stored and retrieved;

an operation mode acquisition step of sending a request to a software part corresponding to a process constituting said job to acquire said operation mode information in accordance with the instruction of said mode program registration start step;

an operation mode response step of acquiring the operation mode information of a predetermined type, which is a return value output from the software part;

a mode program information creating step of creating mode program information including the operation mode information acquired by said mode program registration step and identification information of said mode program; and a mode program information management step of storing the mode program information in a mode program information retaining section.

* * * * *